US012724620B2

(12) United States Patent
Song et al.

(10) Patent No.: US 12,724,620 B2
(45) Date of Patent: Sep. 1, 2026

(54) DATA PROCESSING METHOD, COMPUTER SYSTEM, AND ELECTRONIC DEVICE

(71) Applicant: HUAWEI TECHNOLOGIES CO., LTD., Shenzhen (CN)

(72) Inventors: Dongkuang Song, Hangzhou (CN); Wei Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 69 days.

(21) Appl. No.: 18/425,014

(22) Filed: Jan. 29, 2024

(65) Prior Publication Data

US 2024/0168772 A1 May 23, 2024

Related U.S. Application Data

(63) Continuation of application No. PCT/CN2022/100289, filed on Jun. 22, 2022.

(30) Foreign Application Priority Data

Jul. 30, 2021 (CN) ........................ 202110868877.2

(51) Int. Cl.
*G06F 9/445* (2018.01)
*G06F 9/4401* (2018.01)

(52) U.S. Cl.
CPC ........ *G06F 9/44505* (2013.01); *G06F 9/4401* (2013.01); *G06F 9/4406* (2013.01)

(58) Field of Classification Search
CPC ... G06F 9/44505; G06F 9/4406; G06F 9/4401
See application file for complete search history.

(56) References Cited

U.S. PATENT DOCUMENTS 9,558,016 B2 * 1/2017 Cho ...................... G06F 9/4411
9,727,390 B1 * 8/2017 Righi ........................ G06F 9/54
(Continued)

FOREIGN PATENT DOCUMENTS

CN 103136044 A 6/2013
CN 104991782 A 10/2015

OTHER PUBLICATIONS

Jabari Roberts "Dynamic modification of basic input/output system attributes via the operating system for Intel x86 architecture personal computers", Electronic Dissertations and Theses, Spring May 2005, Southern University and A&M College. https://digitalcommons.subr.edu/dissertations_theses/102/.*

(Continued)

*Primary Examiner* — Jaweed A Abbaszadeh

(57) ABSTRACT

The technology of this application relates to a data processing method, a computer system, and an electronic device. The computer system includes an operating system and firmware. The operating system includes a setup menu program, and the firmware includes a configuration program. The setup menu program is used to invoke the configuration program in response to a received configuration modification operation of a user. The configuration program is used to configure, in response to the invocation of the setup menu program, a corresponding function based on configuration modification information corresponding to the configuration modification operation. In this way, the user can modify function configuration of the system by performing an operation in the setup menu program in the operating system, to resolve a problem in the conventional technology that it is inconvenient for the user to enter a setup menu through the firmware.

20 Claims, 8 Drawing Sheets

(56) References Cited

U.S. PATENT DOCUMENTS

| | | | | |
|---|---|---|---|---|
| 10,540,151 | B1 * | 1/2020 | Righi | G06F 8/34 |
| 2003/0236971 | A1 * | 12/2003 | Rothman | G06F 9/4411 713/1 |
| 2005/0177710 | A1 | 8/2005 | Rothman et al. | |
| 2007/0101115 | A1 * | 5/2007 | Murakami | G06F 8/65 713/1 |
| 2009/0210689 | A1 * | 8/2009 | Harmer | G06F 9/44505 713/1 |
| 2012/0297178 | A1 * | 11/2012 | Peng | G06F 11/2289 713/2 |
| 2014/0208090 | A1 * | 7/2014 | Anson | G06F 21/575 713/2 |
| 2015/0277895 | A1 * | 10/2015 | Samuel | G06F 9/4411 713/1 |
| 2017/0046151 | A1 * | 2/2017 | Hsu | G06F 8/654 |
| 2017/0123927 | A1 * | 5/2017 | Su | G06F 9/4403 |
| 2018/0095693 | A1 | 4/2018 | Kikkawa | |
| 2019/0173749 | A1 * | 6/2019 | Thomas | G06F 9/451 |

OTHER PUBLICATIONS

European Search Report dated Dec. 10, 2024 in European Application No. 22848125.5, 11 pages.

International Search Report mailed Aug. 11, 2022 in International Application No. PCT/CN2022/100289, 11 pages.

* cited by examiner

Computer system

OS

Setup menu program

BIOS invocation program

BIOS

Configuration program

Hardware

DATA PROCESSING METHOD, COMPUTER SYSTEM, AND ELECTRONIC DEVICE

CROSS-REFERENCE TO RELATED APPLICATIONS

This application is a continuation of International Application No. PCT/CN2022/100289, filed on Jun. 22, 2022, which claims priority to Chinese Patent Application No. 202110868877.2, filed on Jul. 30, 2021. The disclosures of the aforementioned applications are hereby incorporated by reference in their entireties.

TECHNICAL FIELD

Embodiments of this application relate to the computer field, and in particular, to a data processing method, a computer system, and an electronic device.

BACKGROUND

A setup menu is a man-machine interaction interface provided by a basic input output system (BIOS) for a user to view and modify system configuration.

When the user needs to modify the system configuration on the setup menu, the user can press, when the BIOS runs in a specific stage, a corresponding button to enter the setup menu. However, if the user misses the button or presses an incorrect button, the user needs to restart a computer and try to enter the setup menu again. In addition, the setup menu is included in a binary file of the BIOS. After the setup menu is modified, the BIOS needs to be updated accordingly. Because the BIOS is a key path for starting an operating system (OS), the OS cannot be started once the BIOS is faulty. Therefore, the user is usually cautious when upgrading the BIOS to avoid a problem during the upgrade.

SUMMARY

To resolve the foregoing technical problem, this application provides a data processing method, a computer system, and an electronic device. In the method, a user can modify system configuration by performing an operation in a setup menu program in an operating system, to resolve a problem in the conventional technology that it is inconvenient for the user to enter a setup menu through firmware, and avoids a problem that the firmware needs to be released and needs to be upgraded when the setup menu is modified.

According to a first aspect, an embodiment of this application provides a computer system. The computer system includes an operating system and firmware. The operating system includes a setup menu program, and the firmware includes a configuration program. The setup menu program is used to invoke the configuration program in response to a received configuration modification operation of a user. The configuration program is used to configure, in response to the invocation of the setup menu program, a corresponding function based on configuration modification information corresponding to the configuration modification operation. In this way, the user can modify function configuration of the system by performing an operation in the setup menu program in the operating system, to resolve a problem in the conventional technology that it is inconvenient for the user to enter a setup menu through the firmware. In addition, because the setup menu is decoupled from the firmware, this avoids that the firmware needs to be released and needs to be upgraded when the setup menu is modified, and improves convenience of modifying the setup menu. In addition, the setup menu is implemented in the operating system, and a user interface is more friendly. This improves user experience.

For example, the firmware is a BIOS.

According to the first aspect, the computer system further includes hardware. The hardware includes a memory. A data storage area of the operating system is disposed in the memory. The setup menu program is further used to store the configuration modification information in the data storage area of the operating system. In this way, the configuration modification information of the user can be stored in the data storage area of the operating system, and the operating system does not need to access a data storage area of the firmware. This ensures data security in the data storage area of the firmware.

According to the first aspect or any one of the foregoing implementations of the first aspect, the computer system further includes hardware. The hardware includes a memory. A data storage area of the firmware is further set in the memory. The configuration program is further used to store the configuration modification information in the data storage area of the firmware in response to the invocation of the setup menu program. In this way, the operating system can store the configuration modification information of the user in the data storage area of the firmware by invoking the configuration program in the firmware. Because the operating system does not directly access the data storage area of the firmware, data security in the data storage area of the firmware can be ensured.

According to the first aspect or any one of the foregoing implementations of the first aspect, a function of the configuration program is implemented by a scheduler and a plurality of function configuration programs. The setup menu program is used to invoke the scheduler in response to the received configuration modification operation of the user. The scheduler is used to: in response to the invocation of the setup menu program, parse the configuration modification information, determine a target function configuration program, and invoke the target function configuration program. The function configuration program is used to configure, in response to the invocation of the scheduler, a corresponding function based on the configuration modification information.

For example, a function of the configuration program may also be implemented by a scheduler, a plurality of function configuration programs, and another program. This is not limited in this embodiment of this application.

According to the first aspect or any one of the foregoing implementations of the first aspect, the setup menu program is used to invoke the configuration program via a dedicated instruction, a mailbox, or an interrupt.

According to a second aspect, an embodiment of this application provides a computer system. The computer system includes an operating system and firmware. The operating system includes a setup menu program and a program for invoking firmware. The firmware includes a configuration program. The setup menu program is used to invoke the program for invoking the firmware in response to a received configuration modification operation of a user. The program for invoking the firmware is used to invoke the configuration program in response to the invocation of the setup menu program. The configuration program is used to configure, in response to the invocation of the program for invoking the firmware, a corresponding function based on configuration modification information corresponding to the configuration modification operation. In this way, the user can modify function configuration of the system by performing an operation in the setup menu program in the operating system, to resolve a problem in the conventional technology that it is inconvenient for the user to enter a setup menu through the firmware. In addition, because the setup menu is decoupled from the firmware, this avoids that the firmware needs to be released and needs to be upgraded when the setup menu is modified, and improves convenience of modifying the setup menu. In addition, the setup menu is implemented in the operating system, and a user interface is more friendly. This improves user experience. In addition, another program in the operating system can also invoke the firmware by invoking the program for invoking the firmware. This has higher universality.

For example, the firmware is a BIOS.

For example, the program for invoking the firmware is a BIOS invocation program.

According to the second aspect, the computer system further includes hardware. The hardware includes a memory. A data storage area of the operating system is disposed in the memory. The setup menu program is further used to store the configuration modification information in the data storage area of the operating system.

According to the second aspect or any one of the foregoing implementations of the second aspect, the computer system further includes hardware. The hardware includes a memory. A data storage area of the firmware is disposed in the memory. The configuration program is further used to store the configuration modification information in the data storage area of the firmware in response to the invocation of the program for invoking the firmware.

According to the second aspect or any one of the foregoing implementations of the second aspect, a function of the configuration program is implemented by a scheduler and a plurality of function configuration programs. The program for invoking the firmware is used to invoke the scheduler in response to the invocation of the setup menu program. The scheduler is used to: in response to the invocation of the program for invoking the firmware, parse the configuration modification information, determine a target function configuration program, and invoke the target function configuration program. The function configuration program is used to configure, in response to the invocation of the scheduler, a corresponding function based on the configuration modification information.

According to the second aspect or any one of the foregoing implementations of the second aspect, the program for invoking the firmware is used to invoke the configuration program via a dedicated instruction, a mailbox, or an interrupt.

Any one of the second aspect and the implementations of the second aspect corresponds to any one of the first aspect and the implementations of the first aspect. For technical effect corresponding to any one of the second aspect and the implementations of the second aspect, refer to the technical effect corresponding to any one of the first aspect and the implementations of the first aspect.

According to a third aspect, an embodiment of this application provides a computer system. The computer system includes an operating system, firmware, and hardware. The hardware includes a memory. A data storage area of the operating system is disposed in the memory. The data storage area of the operating system stores configuration modification information of a user. The operating system is used to invoke the firmware in a startup process of the computer system. The firmware is used to configure, in response to the invocation of the operating system, a corresponding function based on the configuration modification information. In this way, after the configuration modification information of the user is stored in the data storage area of the operating system, after the operating system runs in the startup process of the computer system, the operating system can invoke the firmware to perform configuration based on the configuration modification information of the user. This ensures validity of modifying system configuration by the user from a setup menu in the operating system.

According to a fourth aspect, an embodiment of this application provides a computer system. The computer system includes an operating system and firmware. The operating system includes a setup menu program. The setup menu program is used to: in response to a received startup operation of a user, obtain configuration information of a function that can be invoked by the operating system and that is of the firmware, and display the configuration information of the function. In this way, the user can open the setup menu program in the operating system to view system configuration.

According to the fourth aspect, the setup menu program is used to: obtain function information provided by the firmware for the operating system, where the function information includes configuration information of the function; and extract the configuration information of the function from the function information. In this way, the setup menu program can quickly obtain the configuration information.

According to the fourth aspect or any one of the foregoing implementations of the fourth aspect, the setup menu program is used to: obtain the function information provided by the firmware for the operating system, where the function information includes interface information corresponding to an interface used to obtain the configuration information of the function; and extract the interface information from the function information, and invoke a corresponding information obtaining interface based on the interface information, to obtain the configuration information of the function. In this way, in a startup process of the computer system, time for obtaining the configuration information by the firmware is reduced, and running efficiency of the firmware is improved.

According to a fifth aspect, an embodiment of this application provides a data processing method. The method is applied to a computer system. The computer system includes an operating system and firmware. The operating system includes a setup menu program, and the firmware includes a configuration program. The method includes: The setup menu program invokes the configuration program in response to a received configuration modification operation of a user; and the configuration program configures, in response to the invocation of the setup menu program, a corresponding function based on configuration modification information corresponding to the configuration modification operation.

According to the fifth aspect, the computer system further includes hardware. The hardware includes a memory. A data storage area of the operating system is disposed in the memory. The method further includes: The setup menu program stores the configuration modification information in the data storage area of the operating system.

According to the fifth aspect or any one of the foregoing implementations of the fifth aspect, the computer system further includes hardware. The hardware includes a memory. A data storage area of the firmware is further set in the memory. The configuration program stores the configuration modification information in the data storage area of the firmware in response to the invocation of the setup menu program.

According to the fifth aspect or any one of the foregoing implementations of the fifth aspect, a function of the configuration program is implemented by a scheduler and a plurality of function configuration programs. That the setup menu program invokes the configuration program in response to a received configuration modification operation of a user includes: The setup menu program invokes the scheduler in response to the received configuration modification operation of the user. That the configuration program configures, in response to the invocation of the setup menu program, a corresponding function based on configuration modification information corresponding to the configuration modification operation includes: In response to the invocation of the setup menu program, the scheduler parses the configuration modification information, determines a target function configuration program, and invokes the target function configuration program; and the function configuration program configures, in response to the invocation of the scheduler, a corresponding function based on the configuration modification information.

According to the fifth aspect or any one of the foregoing implementations of the fifth aspect, that the setup menu program invokes the configuration program in response to a received configuration modification operation of a user includes: The setup menu program invokes, in response to the received configuration modification operation of the user, the configuration program via a dedicated instruction, a mailbox, or an interrupt.

Any one of the fifth aspect and the implementations of the fifth aspect corresponds to any one of the first aspect and the implementations of the first aspect. For technical effect corresponding to any one of the fifth aspect and the implementations of the fifth aspect, refer to the technical effect corresponding to any one of the first aspect and the implementations of the first aspect.

According to a sixth aspect, an embodiment of this application provides a data processing method. The method is applied to a computer system. The computer system includes an operating system and firmware. The operating system includes a setup menu program and a program for invoking firmware, and the firmware includes a configuration program. The method includes: The setup menu program invokes the program for invoking the firmware in response to a received configuration modification operation of a user; the program for invoking the firmware invokes the configuration program in response to the invocation of the setup menu program; and the configuration program configures, in response to the invocation of the program for invoking the firmware, a corresponding function based on configuration modification information corresponding to the configuration modification operation of the user.

According to the sixth aspect the computer system further includes hardware. The hardware includes a memory. A data storage area of the operating system is disposed in the memory. The method further includes: The setup menu program stores the configuration modification information in the data storage area of the operating system.

According to the sixth aspect or any one of the foregoing implementations of the sixth aspect, the computer system further includes hardware. The hardware includes a memory. A data storage area of the firmware is disposed in the memory. The method further includes: The configuration program stores configuration modification information in the data storage area of the firmware in response to the invocation of the program for invoking the firmware.

According to the sixth aspect or any one of the foregoing implementations of the sixth aspect, a function of the configuration program is implemented by a scheduler and a plurality of function configuration programs. That the program for invoking the firmware invokes the configuration program in response to the invocation of the setup menu program includes: The program for invoking the firmware invokes the scheduler in response to the invocation of the setup menu program. That the configuration program configures, in response to the invocation of the program for invoking the firmware, a corresponding function based on configuration modification information corresponding to the configuration modification operation includes: In response to the invocation of the program for invoking the firmware, the scheduler parses the configuration modification information, determines a target function configuration program, and invokes the target function configuration program; and the function configuration program configures, in response to the invocation of the scheduler, a corresponding function based on the configuration modification information.

According to the sixth aspect or any one of the foregoing implementations of the sixth aspect, that the program for invoking the firmware invokes the configuration program in response to the invocation of the setup menu program includes: The program for invoking the firmware invokes, in response to the invocation of the setup menu program, the configuration program via a dedicated instruction, a mailbox, or an interrupt.

Any one of the sixth aspect and the implementations of the sixth aspect corresponds to any one of the second aspect and the implementations of the second aspect. For technical effect corresponding to any one of the sixth aspect and the implementations of the sixth aspect, refer to the technical effect corresponding to any one of the second aspect and the implementations of the second aspect.

According to a seventh aspect, an embodiment of this application provides a data processing method. The method is applied to a computer system. The computer system includes an operating system, firmware, and hardware. The hardware includes a memory. A data storage area of the operating system is disposed in the memory. The data storage area of the operating system stores configuration modification information of a user. The operating system invokes the firmware in a startup process of the computer system. The firmware configures, in response to the invocation of the operating system, a corresponding function based on the configuration modification information.

Any one of the seventh aspect and the implementations of the seventh aspect corresponds to any one of the third aspect and the implementations of the third aspect. For technical effect corresponding to any one of the seventh aspect and the implementations of the seventh aspect, refer to the technical effect corresponding to any one of the third aspect and the implementations of the third aspect.

According to an eighth aspect, an embodiment of this application provides a data processing method. The method is applied to a computer system. The computer system includes an operating system and firmware. The operating system includes a setup menu program. The setup menu program is used to: in response to a received startup operation of a user, obtain configuration information of a function that can be invoked by the operating system and that is of the firmware, and displays the configuration information of the function.

According to the eighth aspect, the obtaining configuration information of a function that can be invoked by the operating system and that is of the firmware includes: The setup menu program obtains function information provided by the firmware for the operating system, where the function information includes the configuration information of the function; and the setup menu program extracts the configuration information of the function from the function information.

According to the eighth aspect or any one of the foregoing implementations of the eighth aspect, the obtaining configuration information of a function that can be invoked by the operating system and that is of the firmware includes: The setup menu program obtains the function information provided by the firmware for the operating system, where the function information includes interface information corresponding to an interface used to obtain configuration information of the function; and the setup menu program extracts the interface information from the function information, and invoking a corresponding information obtaining interface based on the interface information, to obtain the configuration information of the function.

Any one of the eighth aspect and the implementations of the eighth aspect corresponds to any one of the fourth aspect and the implementations of the fourth aspect. For technical effect corresponding to any one of the eighth aspect or the implementations of the eighth aspect, refer to technical effect corresponding to any one of the fourth aspect or the implementations of the fourth aspect.

According to a ninth aspect, an embodiment of this application provides an electronic device, including a memory and a processor. The memory is coupled to the processor. The memory stores program code of an operating system and firmware. When the program code of the operating system and the firmware is executed by the processor, the electronic device is enabled to perform the data processing method according to any one of the fifth aspect or the possible implementations of the fifth aspect.

Any one of the ninth aspect or the implementations of the ninth aspect corresponds to any one of the fifth aspect or the possible implementations of the fifth aspect. For technical effect corresponding to any one of the ninth aspect or the implementations of the ninth aspect, refer to technical effect corresponding to any one of the fifth aspect or the possible implementations of the fifth aspect.

According to a tenth aspect, an embodiment of this application provides an electronic device, including a memory and a processor. The memory is coupled to the processor. The memory stores program code of an operating system and firmware. When the program code of the operating system and the firmware is executed by the processor, the electronic device is enabled to perform the data processing method according to any one of the sixth aspect or the possible implementations of the sixth aspect.

Any one of the tenth aspect or the implementations of the tenth aspect corresponds to any one of the sixth aspect or the possible implementations of the sixth aspect. For technical effect corresponding to any one of the tenth aspect or the implementations of the tenth aspect, refer to technical effect corresponding to any one of the sixth aspect or the possible implementations of the sixth aspect.

According to an eleventh aspect, an embodiment of this application provides an electronic device, including a memory and a processor. The memory is coupled to the processor. The memory stores program code of an operating system and firmware. When the program code of the operating system and the firmware is executed by the processor, the electronic device is enabled to perform the data processing method according to any one of the seventh aspect or the possible implementations of the seventh aspect.

Any one of the eleventh aspect or the implementations of the eleventh aspect corresponds to any one of the seventh aspect or the possible implementations of the seventh aspect. For technical effect corresponding to any one of the eleventh aspect or the implementations of the eleventh aspect, refer to technical effect corresponding to any one of the seventh aspect or the possible implementations of the seventh aspect.

According to a twelfth aspect, an embodiment of this application provides an electronic device, including a memory and a processor. The memory is coupled to the processor. The memory stores program code of an operating system and firmware. When the program code of the operating system and the firmware is executed by the processor, the electronic device is enabled to perform the data processing method according to any one of the eighth aspect or the possible implementations of the eighth aspect.

Any one of the twelfth aspect or the implementations of the twelfth aspect corresponds to any one of the eighth aspect or the possible implementations of the eighth aspect. For technical effect corresponding to any one of the twelfth aspect or the implementations of the twelfth aspect, refer to technical effect corresponding to any one of the eighth aspect or the possible implementations of the eighth aspect.

According to a thirteenth aspect, an embodiment of this application provides a computer storage medium. The computer-readable storage medium stores a computer program. When the computer program runs on a computer or a processor, the computer or the processor is enabled to perform the data processing method according to any one of the fifth aspect or the possible implementations of the fifth aspect.

Any one of the thirteenth aspect or the implementations of the thirteenth aspect corresponds to any one of the fifth aspect or the possible implementations of the fifth aspect. For technical effect corresponding to any one of the thirteenth aspect or the implementations of the thirteenth aspect, refer to technical effect corresponding to any one of the fifth aspect or the possible implementations of the fifth aspect.

According to a fourteenth aspect, an embodiment of this application provides a computer storage medium. The computer-readable storage medium stores a computer program. When the computer program runs on a computer or a processor, the computer or the processor is enabled to perform the data processing method according to any one of the sixth aspect or the possible implementations of the sixth aspect.

Any one of the fourteenth aspect or the implementations of the fourteenth aspect corresponds to any one of the sixth aspect or the possible implementations of the sixth aspect. For technical effect corresponding to any one of the fourteenth aspect or the implementations of the fourteenth aspect, refer to technical effect corresponding to any one of the sixth aspect or the possible implementations of the sixth aspect.

According to a fifteenth aspect, an embodiment of this application provides a computer storage medium. The computer-readable storage medium stores a computer program. When the computer program runs on a computer or a processor, the computer or the processor is enabled to perform the data processing method according to any one of the seventh aspect or the possible implementations of the seventh aspect.

Any one of the fifteenth aspect or the implementations of the fifteenth aspect corresponds to any one of the seventh aspect or the possible implementations of the seventh aspect. For technical effect corresponding to any one of the fifteenth aspect or the implementations of the fifteenth aspect, refer to technical effect corresponding to any one of the seventh aspect or the possible implementations of the seventh aspect.

According to a sixteenth aspect, an embodiment of this application provides a computer storage medium. The computer-readable storage medium stores a computer program. When the computer program runs on a computer or a processor, the computer or the processor is enabled to perform the data processing method according to any one of the eighth aspect or the possible implementations of the eighth aspect.

Any one of the sixteenth aspect or the implementations of the sixteenth aspect corresponds to any one of the eighth aspect or the possible implementations of the eighth aspect. For technical effect corresponding to any one of the sixteenth aspect or the implementations of the sixteenth aspect, refer to technical effect corresponding to any one of the eighth aspect or the possible implementations of the eighth aspect.

DESCRIPTION OF EMBODIMENTS

The following clearly and completely describes the technical solutions in embodiments of this application with reference to the accompanying drawings in embodiments of this application. It is clear that the described embodiments are some but not all of embodiments of this application. All other embodiments obtained by a person of ordinary skill in the art based on embodiments of this application without creative efforts shall fall within the protection scope of this application.

The term "and/or" in this specification describes only an association relationship for describing associated objects and represents that at least three relationships may exist. For example, A and/or B may represent the following three cases: Only A exists, both A and B exist, and only B exists.

In the specification and claims in embodiments of this application, the terms "first", "second", and the like are intended to distinguish between different objects but do not indicate a particular order of the objects. For example, a first target object, and a second target object are used to distinguish between different target objects, but are not used to describe a particular order of the target objects.

In addition, in embodiments of this application, the word "example", "for example", or the like is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

In descriptions of embodiments of this application, unless otherwise stated, "a plurality of" means two or more than two. For example, a plurality of processing units means two or more processing units; and a plurality of systems mean two or more systems.

In embodiments of this application, a computer system may include hardware, firmware, and an OS. For example, the firmware is a group of programs or software that is built in a non-volatile memory of a computer. For example, a BIOS is firmware widely used for computers. In embodiments of this application, the BIOS is used as an example for description.

Figures 1, 2A:
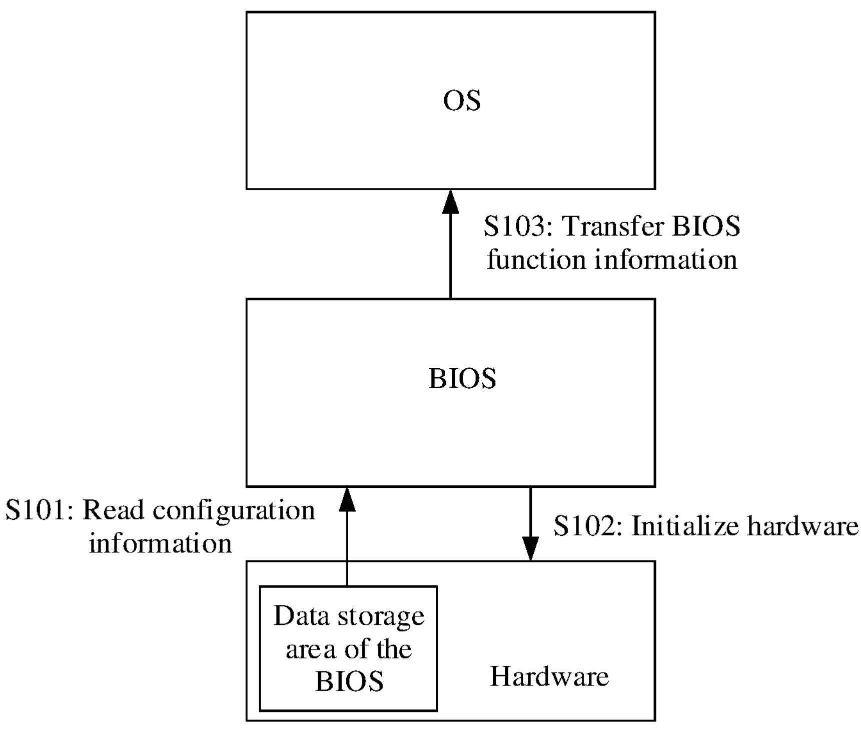
FIG. 1 is a schematic diagram of an example of a startup process of a computer system.
FIG. 2*a* is a schematic diagram of a structure of an example of a computing system.

FIG. 1 is a schematic diagram of an example of a startup process of a computer system.

Refer to FIG. 1. For example, the computer system may include an OS, a BIOS, and hardware.

For example, the OS may be a computer program that manages computer hardware and software resources, for example, Windows, macOS, Linux, or HarmonyOS. Program code of the OS may be stored in a hard disk (for example, a hard disk drive or a solid-state drive) of the computer system.

For example, the BIOS is a firmware interface in a computer, and is a bridge connecting an OS and hardware. Program code of the BIOS may be stored in a non-volatile memory (for example, a flash memory, a read-only memory (ROM)) of the computer system.

For example, the hardware may include but is not limited to hardware devices such as a processor, a memory, a chipset, a hard disk, a graphics card, and a network adapter. The hardware is a carrier for the BIOS and the OS to run, and is an object for the BIOS and the OS to perform function configuration.

For example, a data storage area of the BIOS is disposed in the memory, and the data storage area of the BIOS may be used to store system configuration information, for example, the system configuration information may include configuration information corresponding to a hardware device, configuration information corresponding to the BIOS.

For example, after the computer is powered on or restarted, a central processing unit (CPU) is powered on and reset, and then runs the BIOS. After the BIOS runs, the hardware is initialized. For example, the BIOS can initialize the hardware devices one by one. For example, the memory is initialized first, the graphics card is initialized, then the memory is initialized, and so on. It should be noted that the foregoing is merely an example of initializing the hardware devices by the BIOS. A sequence of initializing the hardware device by the BIOS is not limited in this embodiment of this application.

After the BIOS successfully initializes the hardware, the BIOS can boot the CPU to run the OS. In this case, the computer system is started successfully.

Still refer to FIG. 1. For example, in the startup process of the computer system, a data exchange process may be as follows:

S101: The BIOS reads configuration information from the data storage area of the BIOS.

For example, in the process of initializing the hardware, the BIOS can read the configuration information from the data storage area of the BIOS as required.

For example, before initializing each hardware device, the BIOS only needs to read, from the data storage area of the BIOS, configuration information corresponding to the hardware device.

For example, before initializing the hardware, the BIOS can read, from the data storage area of the BIOS, configuration information corresponding to the BIOS, and then configure a function of the BIOS.

S102: The BIOS initializes the hardware based on the configuration information.

After obtaining configuration information corresponding to any hardware device, the BIOS can configure the hardware device based on the corresponding configuration information, to initialize the hardware.

S103: The BIOS transfers BIOS function information to the OS.

For example, the configuration information corresponding to the hardware device may include configuration information of various functions corresponding to the hardware device, and the configuration information corresponding to the BIOS may include configuration information corresponding to a function of the BIOS.

For example, after hardware initialization is completed, the BIOS may first determine a function that can be invoked by the OS and that is of the BIOS, and then extract, from the obtained configuration information, configuration information corresponding to the function that can be invoked by the OS and that is of the BIOS. Then, the BIOS function information is generated based on the configuration information corresponding to the function that can be invoked by the OS and that is of the BIOS. After the OS runs, the BIOS can transfer the BIOS function information to the OS.

For example, the OS and the BIOS may pre-negotiate a storage area. The BIOS may first store the BIOS function information in the preset storage area, and after running, the OS can read the BIOS function information from the preset storage area as required.

For example, the BIOS function information may include information corresponding to all functions that can be invoked by the OS and that are of the BIOS. For example, the BIOS function information includes but is not limited to the function that can be invoked by the OS and that is of the BIOS, configuration information (for example, may include a configurable item/a configurable range of the function, or a configuration result of the function) of the function, an invocation manner of the function, BIOS version information, hardware information (for example, specification information of a CPU), and the like. It may be understood that the BIOS function information may include more or less information than that shown above. This is not limited in this embodiment of this application.

For example, the invocation manner of the function may be a manner in which the BIOS provides an invocation BIOS interface for the OS. There are a plurality of BIOS interfaces, including but not limited to: a configuration interface used to configure a function, an information obtaining interface used to obtain configuration information, and the like.

For example, the invocation manner may include but is not limited to a dedicated instruction, an interrupt, a mailbox, and the like. It should be noted that there may be more invocation manners than those shown above. This is not limited in this embodiment of this application. For example, the dedicated instruction is an instruction supported by a processor architecture, and may enable the processor to enter a specific execution mode. For example, the interrupt is that if an emergency occurs in the system or the current program, the processor immediately stops running of the current program, automatically switches to a corresponding processing program, and returns to the original program after the processing is completed. The interrupt may include a hardware interrupt and a software interrupt. For example, the mailbox means space in which the BIOS exchanges messages with the OS, and includes but is not limited to a memory, a register, and the like.

For example, a configuration result of the function may be a current configuration result of the function in the computer system.

For example, the BIOS function information may be a table, and may be referred to as a BIOS function information table. For example, a format of the BIOS function information table may be preset. Specifically, the format may be set based on a requirement. This is not limited in this embodiment of this application. For example, the BIOS function information table may be shown in Table 1.

TABLE 1

| Item | Function | Configurable item | Configuration result | Invocation manner |
|---|---|---|---|---|
| Table ID | | | 12345 | |
| Table version | | | V2.1 | |
| COM 1 | Baud rate | 9600 bps, 19200 bps, 115200 bps | 9600 bps | Dedicated instruction |
| | On/Off state | ON (on), OFF (off) | ON | Dedicated instruction |
| COM 2 | Baud rate | 9600 bps, 19200 bps, 115200 bps | 19200 bps | mailbox |
| | On/Off state | ON, OFF | ON | mailbox |
| COM 3 | Baud rate | 19200 bps, 38400 bps, 115200 bps | | Interrupt |
| | On/Off state | ON, OFF | OFF | Interrupt |
| | | . . . | | |
| PCIe 1 | Port distribution | x16x1 x8x2 x4x4 (x8x1, x4x2) | x16x1 | Dedicated instruction |
| | Transmission rate | v1, v2, v3 | v1 | Dedicated instruction |
| | On/Off state | ON, OFF | ON | Dedicated instruction |

TABLE 1-continued

| Item | Function | Configurable item | Configuration result | Invocation manner |
|---|---|---|---|---|
| PCIe 2 | Port distribution | x16x1x8x2 | x8x2 | Dedicated instruction |
| | Transmission rate | v1, v2, v3 | v2 | Dedicated instruction |
| Item | Function | Configurable item | Configuration result | Invocation manner |
| | On/Off state | ON, OFF | ON | Dedicated instruction |
| . . . | | . . . | | |
| CPU | Energy efficiency | Energy efficiency level 1, energy efficiency level 2, and energy efficiency level 3 | Energy efficiency level 1 | Interrupt |
| CPU specifications | | Model: ** Quantity of cores: Dominant frequency information: | | |
| BIOS version | | BIOS 3.4 | | |
| BIOS | Fault tolerance policy | Policy 1, policy 2, policy 3, and policy 4 | Policy 1 | mailbox |

For example, the “table ID” in the item column of Table 1 may be an identity document (Identity Document, ID) of the BIOS function information table, and may be used to uniquely identify the BIOS function information table.

For example, the “table version” in the item column of Table 1 may be a version of the BIOS function information table.

For example, basic information of the BIOS function information table, such as the table ID and the table version, may be used by the OS to determine whether the BIOS function information table is required, and determine compatibility of the BIOS.

It should be understood that the BIOS function information table may further include more basic information (for example, a “table length”, namely, a length of the BIOS function information table) of the BIOS function information table than that shown in Table 1. This is not limited in this embodiment of this application.

For example, the hardware device of the computer system has a corresponding hardware identifier, and the hardware identifier may be used to uniquely identify the hardware device. For example, the hardware identifier may be a hardware name, or may be an identification code. For example, an identifier of the CPU may be a name “CPU”, or may be a segment of identification codes such as “BFEBFBBFF000**”. For another example, there are a plurality of COMs (serial interfaces), and an identifier of each COM may be a serial number of a serial interface, for example, a “COM 1”, a “COM 2”, or a “COM 3”. For another example, there may be a plurality of peripheral component interconnect express (Peripheral Component Interconnect Express, PCIe) interfaces, and an identifier of each PCIe may be a serial number of the PCIe, for example, a “PCIe 1”, a “PCIe 2”, or a “PCIe 3”.

For example, the “COM 1” in the item column in Table 1 indicates a serial interface of the computer system, the “COM 2” in the item column in Table 1 indicates another serial interface of the computer system, and the “COM 3” in the item column in Table 1 indicates still another serial interface of the computer system.

For example, the “PCIe 1” in the item column in Table 1 indicates a peripheral component interconnect express interface of the computer system, and the “PCIe 2” in the item column in Table 1 indicates another peripheral component interconnect express interface of the computer system.

For example, the “CPU” in the item column in Table 1 indicates a central processing unit of the computer system.

For example, the “BIOS version” in the item column in Table 1 means a version of the BIOS in the computer system.

For example, the “BIOS” in the item column in Table 1 means the BIOS in the computer system.

For example, the “function” column in Table 1 includes a function that can be invoked by the OS and that is of the BIOS. For example, for the hardware device COM 1, the function that can be invoked by the OS and that is of the BIOS includes but is not limited to a baud rate, an on/off state, and the like. For example, for the hardware device PCIe 1, the function that can be invoked by the OS and that is of the BIOS includes but is not limited to a port distribution, a transmission rate, an on/off state, and the like. For the CPU, the function that can be invoked by the OS and that is of the BIOS includes but is not limited to energy efficiency and the like. For another example, for the BIOS, the function that can be invoked by the OS and that is of the BIOS includes but is not limited to a fault tolerance policy.

For example, a “configurable item” of the baud rate of the COM 1 in Table 1 may be a configurable item that is of the baud rate of the COM 1 and that can be provided by the BIOS for the OS, and may include 9600 bps, 19200 bps, and 115200 bps. A “configurable item” of the on/off state of the COM 1 in Table 1 may be a configurable item that is of the on/off state of the COM 1 and that can be provided by the BIOS for the OS, and includes ON and OFF. A meaning of a configurable item of a corresponding function of the COM 2, the COM 3, and the like is similar to that of the configurable item of the COM 1.

For example, a “configurable item” of the port distribution of the PCIe 1 in Table 1 may be a configurable item that is of the port distribution of the PCIe 1 and that can be provided by the BIOS for the OS, and may include x16 x1, x8 x2, x4 x4, and (x8 x1, x4x2). A “configurable item” of the transmission rate of the PCIe 1 in Table 1 may be a configurable item that is of the transmission rate of the PCIe 1 and that can be provided by the BIOS for the OS, and may include v1, v2, and v3. A “configurable item” of the on/off state of the PCIe 1 in Table 1 may be a configurable item that is of the on/off state of the PCIe 1 and that can be provided by the BIOS for the OS, and may include ON and OFF.

For example, "x16x1" indicates that the PCIe has a group of ports. The port has 16 channels. The port can be used by a hardware device with 16 channels. "x8x2" indicates that the PCIe has two groups of ports. The two groups of ports each have eight channels (the PCIe has 16 channels in total). The two groups of ports can be used by two hardware devices with eight channels. "x4x4" indicates that the PCIe has four groups of ports. The four groups of ports each have four channels (the PCIe has 16 channels in total). The four groups of ports can be used by four hardware devices with four channels. "(x8x1, x4x2)" indicates that the PCIe has three groups of ports. The three groups of ports each have eight channels, four channels, and four channels (the PCIe includes 16 channels in total). The ports having eight channels can be used by hardware devices with eight channels, and the ports having four channels can be used by hardware devices with four channels.

For example, a "configurable item" of the energy efficiency of the CPU in Table 1 may be a configurable item that is of the energy efficiency of the CPU and that can be provided by the BIOS for the OS, and may include an energy efficiency level 1, an energy efficiency level 2, and an energy efficiency level 3.

For example, a "configurable item" of the fault tolerance policy of the BIOS in Table 1 may be a configurable item that is of the fault tolerance policy of the BIOS and that can be provided by the BIOS for the OS, and may include a policy 1, a policy 2, a policy 3, and a policy 4.

For example, the "invocation manner" in Table 1 may be a manner of invoking, when the OS performs function configuration, a corresponding configuration interface provided by the BIOS. For example, interface information corresponding to the configuration interface provided by the BIOS may be preconfigured. When performing function configuration, the OS may invoke the corresponding configuration interface based on the interface information and the invocation manner corresponding to the configuration interface. For example, the interface information may include an interface parameter, a meaning of the interface parameter. This is not limited in this embodiment of this application.

It should be noted that, Table 1 shows only an example of a case in which each function corresponds to a plurality of configuration items. It may be understood that some functions may correspond to one or more configuration ranges. This is not limited in this embodiment of this application.

For example, a "configuration result" in Table 1 may be a current configuration result of a function, and may include a current configuration result of a hardware device function (for example, in Table 1, a current configuration result of the baud rate of the COM 1 is "9600 bps", a current configuration result of the on/off state of the COM 1 is "ON", a current configuration result of the baud rate of the COM 2 is "19200 bps", a current configuration result of the on/off state of the COM 2 is "ON", a current configuration result of the on/off state of the COM 3 is "OFF", and so on. For another example, in Table 1, a current configuration result of the port distribution of the PCIe 1 is "x16x1", a current configuration result of the transmission rate of the PCIe 1 is "v1", a current configuration result of the on/off state of the PCIe 1 is "ON", a current configuration result of the port distribution of the PCIe 2 is "x8x2", a current configuration result of the transmission rate of the PCIe 2 is "v2", a current configuration result of the on/off state of PCIe 2 is "ON", and so on. For still another example, in Table 1, a current configuration result of the energy efficiency of the CPU is the "energy efficiency level 1".) In addition, the "configuration result" may include the current configuration result of the BIOS (for example, the current configuration result of the fault tolerance policy of the BIOS is the "policy 1").

It should be noted that Table 1 is only an example of the BIOS function information table. The BIOS function information table may include more or less information than that shown in Table 1. This may be specifically set based on a requirement. This is not limited in this embodiment of this application.

It should be noted that the BIOS function information table may also be in another format. This is not limited in this embodiment of this application.

It should be noted that Table 1 is only a text description of content included in the BIOS function information table, and does not represent a data format transferred by the BIOS function information table.

For example, a function information table provided by the BIOS for the OS may include interface information corresponding to an interface (which may be referred to as an information obtaining interface subsequently) used to obtain configuration information corresponding to a function that can be invoked by the OS, but does not include configuration information corresponding to the function that can be invoked by the OS. The BIOS function information table may further include a manner of invoking the information obtaining interface. Refer to Table 2.

TABLE 2

| Item | Function | Configurable item | Configuration result | Invocation manner |
|---|---|---|---|---|
| Table ID | | | 12345 | |
| Table version | | | V2.1 | |
| COM 1 | Baud rate | Information obtaining interface 1 | Information obtaining interface 1 | Dedicated instruction |
| | On/Off state | Information obtaining interface 1 | Information obtaining interface 1 | Dedicated instruction |
| COM 2 | Baud rate | Information obtaining interface 2 | Information obtaining interface 2 | mailbox |
| | On/Off state | Information obtaining interface 2 | Information obtaining interface 2 | mailbox |
| COM 3 | Baud rate | Information obtaining interface 3 | Information obtaining interface 3 | Interrupt |
| | On/Off state | Information obtaining interface 3 | Information obtaining interface 3 | Interrupt |
| PCIe 1 | Port distribution | Information obtaining interface 4 | Information obtaining interface 4 | Dedicated instruction |

TABLE 2-continued

| Item | Function | Configurable item | Configuration result | Invocation manner |
|---|---|---|---|---|
| | Transmission rate | Information obtaining interface 4 | Information obtaining interface 4 | Dedicated instruction |
| | On/Off state | Information obtaining interface 4 | Information obtaining interface 4 | Dedicated instruction |
| Item | Function | Configurable item | Configuration result | Invocation manner |
| PCIe 2 | Port distribution | Information obtaining interface 5 | Information obtaining interface 5 | Dedicated instruction |
| | Transmission rate | Information obtaining interface 5 | Information obtaining interface 5 | Dedicated instruction |
| | On/Off state | Information obtaining interface 5 | Information obtaining interface 5 | Dedicated instruction |
| . . . | | | | |
| CPU | Energy efficiency | Information obtaining interface 6 | Information obtaining interface 6 | Interrupt |
| CPU specifications | | Model: ** Quantity of cores: ** Dominant frequency information: ** | | |
| BIOS version | | BIOS_3.4 | | |
| BIOS | Fault tolerance policy | Information obtaining interface 7 | Information obtaining interface 7 | mailbox |

For example, the "invocation manner" in Table 2 may be a manner of invoking, when the OS obtains configuration information, a corresponding information obtaining interface provided by the BIOS.

For example, the "configurable item" and "configuration result" columns of the baud rate of the COM 1 in Table 2 show information of an interface used to obtain the baud rate of the COM 1 and corresponding to the configurable item and the configuration result, namely, the information obtaining interface 1. The "configurable item" and "configuration result" columns of the on/off state of the COM 1 in Table 2 show information of an interface used to obtain the on/off state of the COM 1 and corresponding to the configurable item and the configuration result, namely, the information obtaining interface 1. Another COM may be deduced in a similar way.

For example, the "configurable item" and "configuration result" columns of the port distribution of the PCIe 1 in Table 2 show information of an interface used to obtain the port distribution of the PCIe 1 and corresponding to the configurable item and the configuration result, namely, the information obtaining interface 4. The "configurable item" and "configuration result" columns of the on/off state of the PCIe 1 in Table 2 show information of the interface used to obtain the on/off state of the PCIe 1 and corresponding to the configurable item and the configuration result, namely, the information obtaining interface 4. The "configurable item" and "configuration result" columns of the transmission rate of the PCIe 1 in Table 2 show information of an interface used to obtain the transmission rate of the PCIe 1 and corresponding to the configurable item and the configuration result, namely, the information obtaining interface 4. Another PCIe may be deduced in a similar way.

For example, the "configurable item" and "configuration result" columns of the energy efficiency of the CPU in Table 2 show information of an interface used to obtain the energy efficiency of the CPU and corresponding to the configurable item and the configuration result, namely, the information obtaining interface 6.

For example, the "configurable item" and "configuration result" columns of the fault tolerance policy of the BIOS in Table 2 show information of an interface used to obtain the fault tolerance policy of the BIOS and corresponding to the configurable item and the configuration result, namely, the information obtaining interface 7.

It should be noted that, information obtaining interfaces used to obtain a same function of a same hardware device and corresponding to a configurable item and a configuration result may be different, and may be specifically set based on a requirement. This is not limited in this embodiment of this application. For example, an information obtaining interface used to obtain a baud rate of a COM 1 and corresponding to a configurable item is an information obtaining interface 1, and an information obtaining interface used to obtain the baud rate of the COM 1 and corresponding to a configuration result is an information obtaining interface 11.

It should be noted that, information obtaining interfaces used to obtain different functions of a same hardware device and corresponding to a configurable item/a configurable range and a configuration result may be different, and may be specifically set based on a requirement. This is not limited in this embodiment of this application. For example, an information obtaining interface used to obtain a baud rate of a COM 1 and corresponding to a configurable item and a configuration result is an information obtaining interface 1, and an information obtaining interface used to obtain an on/off state of the COM 1 and corresponding to the configurable item and the configuration result is an information obtaining interface 15.

It should be noted that information obtaining interfaces used to obtain same functions of different hardware devices and corresponding to a configurable item/a configurable range and a configuration result may be the same, and may be specifically set based on a requirement. This is not limited in this embodiment of this application. For example, an information obtaining interface used to obtain a baud rate of a COM 1 and corresponding to a configurable item is an information obtaining interface 1, and an information obtaining interface used to obtain a baud rate of a COM 2 and corresponding to a configurable item is an information obtaining interface 1.

It should be noted that Table 2 is only an example of the BIOS function information table. The BIOS function information table may include more information (for example, a parameter meaning and a parameter quantity of an information obtaining interface) or less information than that shown in Table 2. This may be specifically set based on a requirement. This is not limited in this embodiment of this application.

It should be noted that the BIOS function information table may also be in another format. This is not limited in this embodiment of this application.

It should be noted that Table 2 is only a text description of content included in the BIOS function information table, and does not represent a data format transferred by the BIOS function information table.

For example, the BIOS function information table provided by the BIOS for the OS may be any one of Table 1 and Table 2.

It should be noted that Table 2 may be provided by the BIOS for the OS in the startup process of the computer system, or may be preconfigured. This is not limited in this embodiment of this application.

FIG. 2*a* is a schematic diagram of a structure of an example of a computer system. It should be understood that the computer system shown in FIG. 2*a* is merely an example of a computer system.

Refer to FIG. 2*a*. For example, an OS may include a setup menu program and a BIOS invocation program, and a BIOS may include a configuration program.

For example, the setup menu program may provide a man-machine interaction interface for a user to view and modify system configuration.

For example, the setup menu program may be an application running in user space.

For example, the setup menu program may be a program deployed in a kernel.

For example, the BIOS invocation program may be a service of the OS, or may be a library of the OS, and may be specifically set based on a requirement. This is not limited in this embodiment of this application.

For example, the BIOS invocation program may be invoked by the setup menu program, and may invoke the configuration program in the BIOS, and can be used to process, for example, parse, BIOS function information provided by the BIOS.

For example, in FIG. 2*a*, the setup menu program and the BIOS invocation program are independent of each other. Further, another program of the OS may invoke, by invoking the BIOS invocation program, a function that can be invoked by the OS and that is of the BIOS.

For example, the configuration program can be invoked by the BIOS invocation program (the configuration program may provide an interface for the BIOS invocation program for invoking, that is, the foregoing described interface that is provided by the BIOS for the OS; and the configuration program may provide an interface for the BIOS invocation program to invoke, which may include a configuration interface for configuring a function and an information obtaining interface for obtaining configuration information described above), and may be used to: parse the invocation of the BIOS invocation program and configure the function based on a parsing result. The function may include a function of a hardware device and a function of the BIOS. The function configuration may include but is not limited to configuring the function of the hardware device (for example, setting a parameter of the hardware device (for example, setting a baud rate of a COM and setting energy efficiency of a CPU), controlling an on/off state of the hardware (for example, controlling an on/off state of a serial interface and controlling an on/off state of a peripheral component interconnect express (PCIe))), and configuring the function of the BIOS (for example, configuring a fault tolerance policy of the BIOS).

For example, a function of the configuration program of the BIOS may be implemented by one or more programs.

It should be noted that FIG. 2*a* shows only some programs in the BIOS, and the BIOS may include more programs than those shown in FIG. 2*a*. This is not limited in this embodiment of this application. In addition, FIG. 2*a* shows only some programs, services, or libraries in the OS. The OS may have more programs, services, and libraries than those shown in FIG. 2*a*. This is not limited in this embodiment of this application.

Figure 2B:
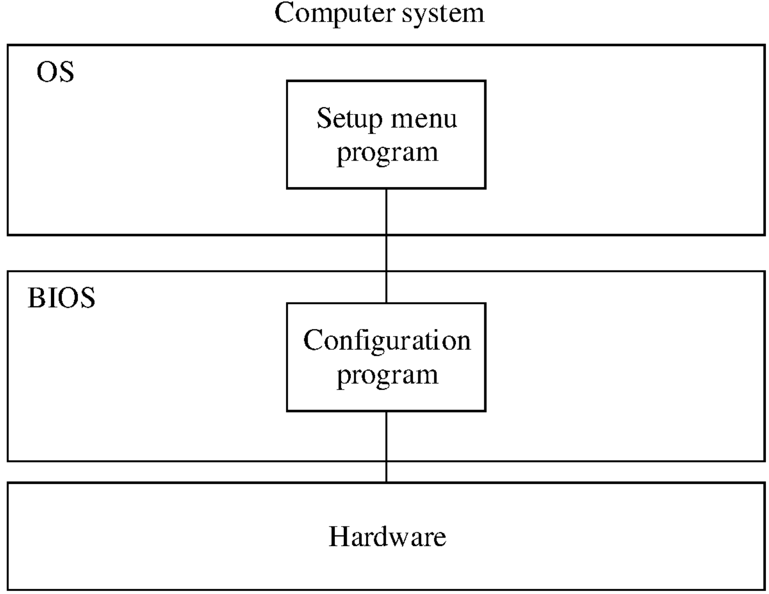
FIG. 2*b* is a schematic diagram of a structure of an example of a computing system.

FIG. 2*b* is a schematic diagram of a structure of an example of a computer system. It should be understood that the computer system shown in FIG. 2*b* is merely an example of a computer system.

Refer to FIG. 2*b*. For example, an OS may include a setup menu program, and a BIOS may include a configuration program.

For example, the setup menu program has functions of the setup menu program and the BIOS invocation program in FIG. 2*a*, and may be considered as integrating the BIOS invocation program into the setup menu program as a part of the setup menu program.

For example, the setup menu program may provide a man-machine interaction interface for a user to view and modify system configuration, may invoke the configuration program in the BIOS, and can be used to process, for example, parse, BIOS function information provided by the BIOS.

For example, the setup menu program may be an application running in user space.

For example, the setup menu program may be a program deployed in a kernel.

For example, the configuration program can be invoked by the setup menu program (the configuration program may provide an interface for the setup menu program for invoking, that is, the foregoing described invocation interface that is provided by the BIOS for the OS). The interface that is provided by the configuration program for the setup menu program for invoking may include a configuration interface for configuring a function and an information obtaining interface for obtaining configuration information described above, and may be used to parse the invocation of the setup menu program, and configure the function based on a parsing result.

For example, a function of the configuration program of the BIOS may be implemented by one or more programs.

It should be noted that FIG. 2*b* shows only some programs in the BIOS, and the BIOS may include more programs than those shown in FIG. 2*b*. This is not limited in this embodiment of this application. In addition, FIG. 2*b* shows only some programs, services, or libraries in the OS. The OS may have more programs, services, and libraries than those shown in FIG. 2*b*. This is not limited in this embodiment of this application.

Figure 3:
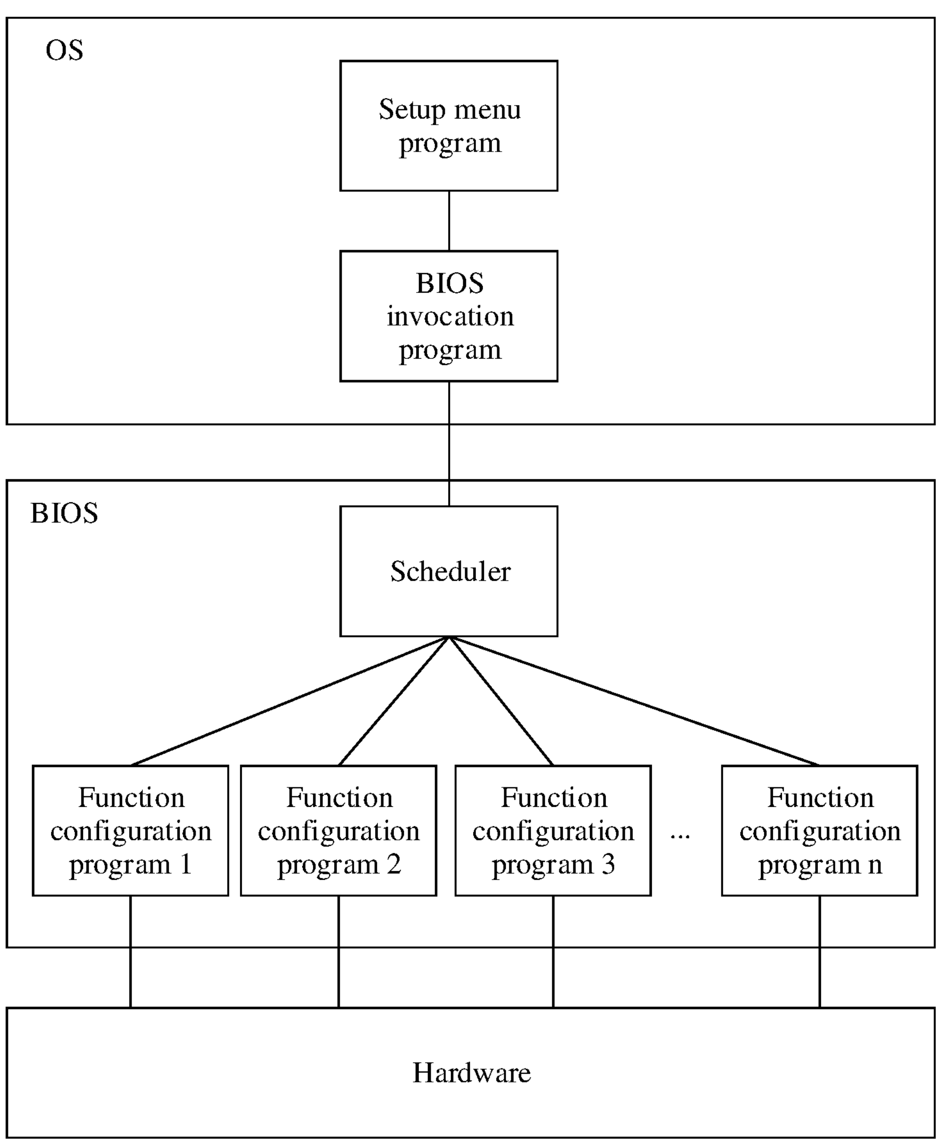
FIG. 3 is a schematic diagram of a structure of an example of a computing system.

FIG. 3 is a schematic diagram of a structure of an example of a computing system.

Refer to FIG. 3. For example, a BIOS may include a scheduler and one or more function configuration programs. The scheduler and one or more function configuration programs can implement a function of a configuration program in the BIOS.

For example, the scheduler can be invoked by an OS (the scheduler can be invoked by a BIOS invocation program in the OS or may be invoked by a setup menu program in the OS, and the scheduler may provide an interface for the BIOS invocation program or the setup menu program for invoking, that is, the foregoing described invocation interface that is provided by the BIOS for the OS). The scheduler may provide an interface for the BIOS invocation program or the setup menu program for invoking, and may include a configuration interface for configuring a function and an information obtaining interface for obtaining configuration information described above, and is used to parse the invocation of the OS, and schedule a function configuration program based on a parsing result.

For example, the function configuration program may be invoked by the scheduler to configure the function.

For example, in FIG. 3, a function configuration program 1 is used to configure a baud rate of a COM, a function configuration program 2 is used to configure a fault tolerance rate of a BIOS, a function configuration program 3 is used to configure energy efficiency of a CPU, and a function configuration program n (e.g., n is a positive integer) may be used to configure an on/off state of PCIe.

It should be noted that, optionally, configuration of a same function for different hardware devices may be implemented by using a same function configuration program. For example, configuration of baud rates of all COMs is implemented by using the function configuration program 1, and configuration of on/off states of all PCIes is implemented by using the function configuration program 2. Optionally, configuration of different functions of a same hardware device may be implemented by using a same function configuration program. For example, configuration of all functions (such as a baud rate and an on/off state) of the COM 1 is implemented by using the function configuration program 1, and configuration of all functions (such as a baud rate and an on/off state) of the COM 2 is implemented by using the function configuration program 2. This is not limited in this embodiment of this application. Optionally, function configuration of the BIOS may be implemented by using at least one function configuration program.

It should be noted that a function of each function configuration program in FIG. 3 may be implemented by one or more programs. This is not limited in this embodiment of this application.

It should be further noted that a function of the configuration program of the BIOS in FIG. 2*a* or FIG. 2*b* may be implemented by using more programs than those shown in FIG. 3. This is not limited in this embodiment of this application. In this embodiment of this application, the computer system shown in FIG. 3 is used as an example for description.

For example, after the computer system is started, when a user needs to view system configuration, the user may start the setup menu program in the OS.

For example, after the computer system receives a startup operation that is performed by the user on the setup menu program in the OS, the OS may run the setup menu program in response to the operation behavior of the user.

For example, after the setup menu program runs, the BIOS invocation program may be invoked to obtain information that needs to be displayed by the setup menu program.

For example, the BIOS invocation program may provide a function information obtaining interface, so that the setup menu program invokes the function information obtaining interface in a startup process. In this way, in the startup process, the setup menu program can invoke the BIOS invocation program by invoking the function information obtaining interface, to obtain the information that needs to be displayed by the setup menu program. Information that needs to be displayed by the setup menu program includes configuration information (such as a configurable item/a configurable range and a configuration result) of a function, attribute information such as BIOS version information and a CPU specification. The information may be specifically set based on a requirement. This is not limited in this embodiment of this application.

For example, after the BIOS invocation program is invoked, the BIOS invocation program may parse, based on a preset format (for example, a format of a BIOS function information table), BIOS function information sent by the BIOS. Then, the information that needs to be displayed by the setup menu program is obtained based on a parsing result, and the information that needs to be displayed by the setup menu program is returned to the setup menu program.

In this way, after the setup menu program opens a home screen, the information that needs to be displayed by the setup menu program may be displayed in a display area corresponding to the home screen.

Table 1 is used as an example. If the information that needs to be displayed on the home screen of the setup menu program includes the attribute information such as the BIOS version information and the CPU specification, the BIOS invocation program can parse the BIOS function information table based on a format corresponding to Table 1, extract the attribute information such as the BIOS version information and the CPU specification from the BIOS function information table, and return the attribute information such as the BIOS version information and the CPU specifications to the setup menu program. Then, the setup menu program may display the BIOS version information (for example, display "BIOS 3.4") in the display area (for example, in an upper right corner or a lower left corner of the home screen) corresponding to the home screen of the setup menu program. For example, the attribute information such as the BIOS version information and the CPU specification cannot be modified.

Table 1 is used as an example. If the information that needs to be displayed on the home screen of the setup menu program includes the configuration information of a function, the BIOS invocation program may parse the BIOS function information table based on a format corresponding to Table 1, directly extract the configuration information of the function from the BIOS function information, and return the configuration information of the function to the setup menu program. Then, the setup menu program displays the configuration information of the function in the display area corresponding to the home screen of the setup menu program.

The baud rate of the COM 1 in Table 1 is used as an example. The BIOS invocation program may parse the BIOS function information table based on the format corresponding to Table 1, directly obtain information from the BIOS function information table: an item "COM 1", a function "baud rate", configurable items "9600 bps, 19200 bps, and 115200 bps", and a configuration result "9600 bps", and return the information to the setup menu program. The setup menu program can display the "baud rate of the COM 1: 9600 bps" on the home screen. For example, a drop-down button may be set for the baud rate. After the user clicks the drop-down button, the setup menu program displays, in response to the operation behavior of the user, configurable items such as "19200 bps", and "115200 bps" in a drop-down list.

The transmission rate of the PCIe 1 in Table 1 is used as an example. The BIOS invocation program may parse the BIOS function information table based on the format corresponding to Table 1, directly obtain information from the BIOS function information table: an item "PCIe 1", a function "transmission rate", configurable items "v1, v2, v3", and a configuration result "v1", and return the information to the setup menu program. The setup menu program can display the "transmission rate of the PCIe 1: v1" on the home screen. For example, a drop-down button may be set for the transmission rate. After the user clicks the drop-down button, the setup menu program displays, in response to the operation behavior of the user, configurable items "v2" and "v3" in the drop-down list.

The energy efficiency of the CPU in Table 1 is used as an example. The BIOS invocation program may parse the BIOS function information table based on the format corresponding to Table 1, directly obtain information from the BIOS function information table: an item "CPU", a function "energy efficiency", configurable items "energy efficiency level 1, energy efficiency level 2, and energy efficiency level 3", and a configuration result: "energy efficiency level 1", and return the information to the setup menu program. The setup menu program can display the "energy efficiency of the CPU: the energy efficiency level 1" on the home screen. For example, a drop-down button may be set for the energy efficiency. After the user clicks the drop-down button, the setup menu program displays, in response to the operation behavior of the user, configurable items "energy efficiency level 2" and "energy efficiency level 3" in the drop-down list.

The fault tolerance policy of the BIOS in Table 1 is used as an example. The BIOS invocation program may parse the BIOS function information table based on the format corresponding to Table 1, directly obtain information from the BIOS function information table: an item "BIOS", a function "fault tolerance policy", configurable items "policy 1, policy 2, policy 3, and policy 4", and a configuration result "policy 1", and return the information to the setup menu program. The setup menu program can display the "fault tolerance policy of the BIOS: the policy 1" on the home screen. For example, a drop-down button may be set for the energy efficiency. After the user clicks the drop-down button, the setup menu program displays, in response to the operation behavior of the user, configurable items "policy 2", "policy 3", and "policy 4" in the drop-down list.

It may be understood that when the configurable item of the function is a configurable range, the setup menu program may display a corresponding configurable range based on a display position of the function on the home screen. This is not limited in this embodiment of this application.

Table 2 is used as an example. If the information that needs to be displayed on the home screen of the setup menu program includes the configuration information corresponding to a function, the BIOS invocation program may parse the BIOS function information table based on a format corresponding to Table 2, and obtain, from the BIOS function information, an information obtaining interface corresponding to the configuration information of the function. Then, the configuration information of the function can be obtained by invoking the information obtaining interface. Then, the configuration information of the function is returned to the setup menu program. The setup menu program displays the configuration information of the function on the home screen.

The baud rate of the COM 1 in Table 2 is used as an example. The BIOS invocation program may parse the BIOS function information table based on the format corresponding to Table 2, extract the information obtaining interface "information obtaining interface 1" from the BIOS function information, and then, invoke the information obtaining interface 1 to obtain the configuration information of the baud rate of the COM 1, where the configuration information includes the configurable items of the baud rate of the COM 1: "9600 bps, 19200 bps, and 115200 bps", and the configuration result of the baud rate of the COM 1: "9600 bps", and return the configuration information to the setup menu program.

The transmission rate of the PCIe 1 in Table 2 is used as an example. The BIOS invocation program may parse the BIOS function information table based on the format corresponding to Table 2, extract the information obtaining interface "information obtaining interface 4" from the BIOS function information, and then, invoke the information obtaining interface 4 to obtain configuration information of the transmission rate of the PCIe 1, where the configuration information includes: configurable items of the transmission rate of the PCIe 1: "v1, v2, v3", and a configuration result of the transmission rate of the PCIe 1: "v1".

The energy efficiency of the CPU in Table 2 is used as an example. The BIOS invocation program may parse the BIOS function information table based on the format corresponding to Table 2, extract the information obtaining interface "information obtaining interface 6" from the BIOS function information, and then, invoke the information obtaining interface 6 to obtain configuration information of the energy efficiency of the CPU, where the configuration information includes: configurable items of the energy efficiency of the CPU "energy efficiency level 1, energy efficiency level 2, and energy efficiency level 3", and the configuration result of the energy efficiency of the CPU "energy efficiency level 1".

The fault tolerance policy of the BIOS in Table 2 is used as an example. The BIOS invocation program may parse the BIOS function information table based on the format corresponding to Table 2, extract the information obtaining interface "information obtaining interface 7" from the BIOS function information, and then, the information obtaining interface 7 is invoked to obtain configuration information of the fault tolerance policy of the BIOS, where the configuration information includes: configurable items of the fault tolerance policy of the BIOS: "policy 1, policy 2, policy 3, and policy 4", and the configuration result of the fault tolerance policy of the BIOS "policy 1".

For example, the home screen of the setup menu program may display BIOS version information, hardware information (for example, specification information of the CPU). For example, the home screen of the setup menu program includes one or more controls, including but limited to a function configuration option (for example, a COM function configuration option (for example, a COM 1 function configuration option, a COM 2 function configuration option . . . ), a PCIe function configuration option (for example, a PCIe 1 function configuration option, a PCIe 2 function configuration option . . . ), a CPU function configuration option, and a BIOS function configuration option). When the user needs to modify the system configuration, the user may perform the configuration modification operation on the function configuration option on the home screen of the setup menu program to modify the system configuration (that is, modify the function configuration in the system).

Figure 4:
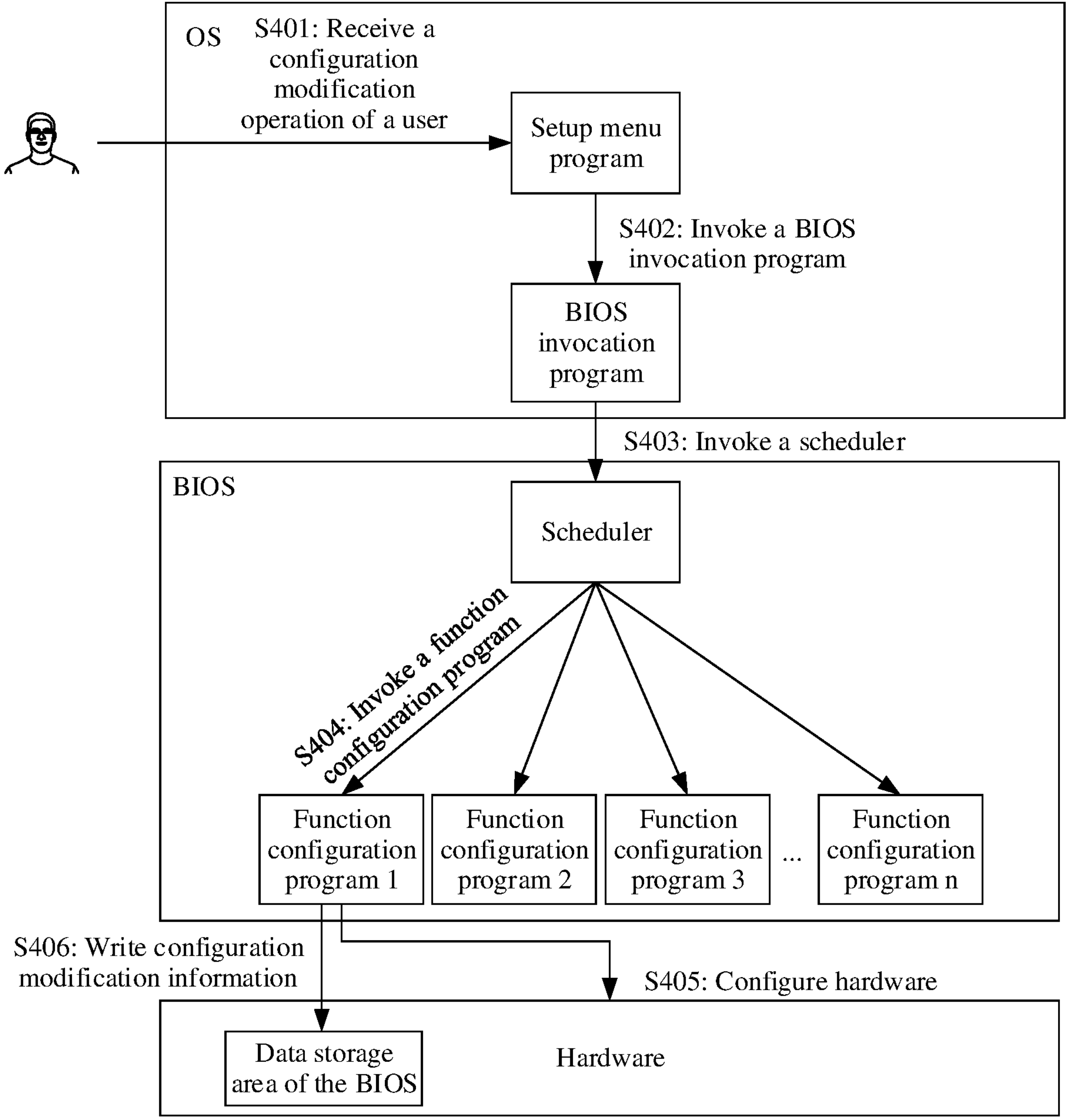
FIG. 4 is a schematic diagram of an example of a configuration process.

FIG. 4 is a schematic diagram of an example of a configuration process. Refer to FIG. 4. In response to operation behavior of a user in a setup menu program, a process of configuring a function by a computer system may be as follows:

S401: The setup menu program receives a configuration modification operation of the user.

After entering a home screen of the setup menu program, the user can modify, on the home screen of the setup menu program, system configuration as required. For example, the user can perform the configuration modification operation on a function configuration item on the home screen of the setup menu program, to modify the system configuration.

For example, if the user needs to modify a baud rate of a COM 1 from "9600 bps" to "115200 bps", the user can click a drop-down button corresponding to a baud rate in a COM 1 function configuration option. The setup menu program displays, in response to the operation behavior of the user, configurable items "19200 bps" and "115200 bps" in a drop-down list. Then the user can click the configurable item "115200 bps", to modify the baud rate of the COM 1.

For example, when the user needs to modify an on/off state of a PCIe 1 from "ON" to "OFF", the user can slide a slide switch corresponding to the on/off state of the PCIe 1, and the setup menu program disables the PCIe 1 in response to the operation behavior of the user.

For example, if the user needs to modify energy efficiency of a CPU from an "energy efficiency level 1" to an "energy efficiency level 2", the user can click a drop-down button corresponding to energy efficiency in a CPU function configuration option. The setup menu program displays, in response to the operation behavior of the user, configurable items: the "energy efficiency level 2" and the "energy efficiency level 3" in a drop-down list. Then the user can click the configurable item "energy efficiency level 2", to configure the energy efficiency of the CPU as the "energy efficiency level 2".

For example, when the user needs to modify a fault tolerance policy of a BIOS from a "policy 1" to a "policy 2", the user may click a drop-down button corresponding to a fault tolerance policy in a BIOS function configuration option. The setup menu program displays, in response to the operation behavior of the user, configuration options: the "policy 2", a "policy 3", and a "policy 4" in a drop-down list. Then the user can click the configurable item "policy 2" to configure the fault tolerance policy of the BIOS as the "policy 2.

For example, all operations performed by the user on the home screen of the setup menu program to complete modification of function configuration may be generally referred to as a configuration modification operation. For example, operations of clicking a drop-down button in a function configuration option and clicking a configurable item by the user may be collectively referred to as a configuration modification operation. For example, the last operation performed by the user on the home screen of the setup menu program to complete modification of function configuration is referred to as a configuration modification operation. For example, an operation of clicking a configurable item by the user may be referred to as a configuration modification operation. Further, after the user performs a configuration modification operation on the home screen of the setup menu program, the setup menu program can receive the configuration modification operation of the user.

S402: The setup menu program invokes a BIOS invocation program.

For example, after receiving the configuration modification operation of the user, the setup menu program can invoke the BIOS invocation program; and the setup menu program can display, in response to the operation behavior of the user, a modification result of the user on the home screen of the setup menu program.

For example, after the setup menu program is started, the baud rate of the COM 1 on the home screen is displayed as "9600 bps". After the user click the configurable item "115200 bps" corresponding to the baud rate of the COM 1 in the drop-down list, the baud rate of the COM 1 on the home screen is displayed as "115200 bps".

For example, after the setup menu program is started, the on/off state of the PCIe 1 on the home screen is displayed as "ON". After the user slides the slide switch corresponding to the on/off state of the PCIe 1, the on/off state of the PCIe 1 on the home screen is displayed as "OFF".

For example, after the setup menu program is started, the energy efficiency of the CPU on the home screen is displayed as the "energy efficiency level 1". After the user click the configurable item "energy efficiency level 2" corresponding to the energy efficiency of the CPU in the drop-down list, the energy efficiency of the CPU on the home screen is displayed as the "energy efficiency level 2".

For example, after the setup menu program is started, the fault tolerance policy of the BIOS displayed on the home screen is the "policy 1". After the user clicks the configurable item "policy 2" corresponding to the fault tolerance policy of the BIOS in the drop-down list, the fault tolerance policy of the BIOS on the home screen is displayed as the "policy 2".

In a possible implementation, the BIOS invocation program can provide a system configuration interface, and further, the setup menu program can invoke the BIOS invocation program by invoking the system configuration interface. For example, after receiving the configuration modification operation of the user, the setup menu program can determine configuration modification information corresponding to the configuration modification operation of the user. For example, the configuration modification information may include but is not limited to a function identifier and user setting information. The function identifier is used to uniquely identify a function. For example, a function identifier corresponding to the baud rate of the COM 1 may be COM1_BPS, a function identifier of the on/off state of the PCIe 1 may be PCIe1_Switch, a function identifier corresponding to the fault tolerance policy of the BIOS may be BIOS_FTR, and a function identifier corresponding to the energy efficiency of the CPU may be CPU_EE. It should be noted that the foregoing function identifier is merely an example, and the function identifier may be in another form. This is not limited in this embodiment of this application. For example, in the foregoing example, the user modifies the baud rate of the COM 1 from "9600 bps" to "115200 bps", and the configuration modification information determined by the setup menu program may include COM1_BPS (function identifier) and 115200 bps (user setting information). Then, the system configuration interface provided by the BIOS invocation program is invoked, and the configuration modification information is transferred to the system configuration interface, and then the BIOS invocation program performs S403.

In a possible implementation, the setup menu program can invoke the BIOS invocation program in a memory sharing manner. For example, the setup menu program and the BIOS invocation program can pre-agree on a shared memory. After receiving the configuration modification operation of the user, the setup menu program can determine the configuration modification information corresponding to the configuration modification operation, and write the configuration modification information into the shared memory. The BIOS invocation program can poll the shared memory. When it is found through polling that the configuration modification information newly written by the setup menu program exists in the memory, the system configuration interface of the BIOS invocation program can be invoked to read the configuration modification information from the memory, and then S403 is performed.

S403: The BIOS invocation program invokes a scheduler.

For example, after receiving the invocation of the setup menu program, the BIOS invocation program can invoke the scheduler in the BIOS.

For example, the BIOS invocation program belongs to the OS, the scheduler belongs to the BIOS, and the two belong to different systems. A communication channel between the BIOS invocation program and the scheduler may be first established, and then the BIOS invocation program and the scheduler communicate with each other based on the established communication channel and a configuration interface provided by the scheduler.

For example, a method for establishing the communication channel between the BIOS invocation program and the scheduler is preconfigured in the BIOS invocation program, in other words, the BIOS invocation program includes program code of the method for establishing the communication channel between the BIOS invocation program and the scheduler.

For example, a manner of establishing the communication channel between the BIOS invocation program and the scheduler may correspond to an invocation manner of the function, in other words, the manner of establishing the communication channel between the BIOS invocation program and the scheduler includes but is not limited to a dedicated instruction, a mailbox, and an interrupt.

Dedicated Instruction

For example, an OS and a BIOS may be two systems at different levels that run by a same core of the CPU, and a CPU core can run only one system each time. For example, the OS and the BIOS may pre-agree on a general purpose register. For example, a BIOS invocation program and a scheduler may pre-agree on a general purpose register. For example, the BIOS invocation program includes the dedicated instruction. For example, after the BIOS invocation program receives the invocation of the setup menu program, the BIOS invocation program can write obtained configuration modification information into the general purpose register. After the dedicated instruction in the BIOS invocation program is executed by the CPU, the CPU stops running the OS, and switches to running the BIOS. For example, the CPU may stop running the BIOS invocation program in the OS, and switch to running the scheduler in the BIOS, and then the scheduler invokes a configuration interface to read the configuration modification information from the pre-agreed general purpose register; and then the scheduler performs S404 based on the configuration modification information.

Mailbox

For example, an OS and a BIOS may be two systems that can run simultaneously; and the OS may be a main system, and the BIOS may be a subsystem; or both the OS and the BIOS are subsystems. For example, a BIOS invocation program can invoke a scheduler via the mailbox.

For example, the OS and the BIOS may pre-negotiate a shared register or memory (which may be referred to as the mailbox). For example, the BIOS invocation program and the scheduler may pre-agree on the mailbox. For example, after the BIOS invocation program receives the invocation of the setup menu program, the BIOS invocation program can write obtained configuration modification information into the mailbox. In a running process, the scheduler in the BIOS can invoke a configuration interface to read, from the mailbox, the configuration modification information written by the BIOS invocation program, and then the scheduler performs S404 based on the configuration modification information.

In a possible manner, after the BIOS invocation program writes the configuration modification information into the mailbox, the mailbox can notify the scheduler. After receiving the notification, the scheduler invokes the configuration interface to read, from the mailbox, the configuration modification information written by the BIOS invocation program.

In a possible manner, after the BIOS invocation program writes the configuration modification information into the mailbox, the mailbox does not notify the scheduler, but the scheduler polls the mailbox. In a process of polling the mailbox by the scheduler, after it is found through polling that new configuration modification information written by the BIOS invocation program exists in the mailbox, the configuration interface can be invoked to read, from the mailbox, the configuration modification information written by the BIOS invocation program.

Interrupt

For example, an OS and a BIOS may be two systems at different levels that run by a same core of the CPU, and a CPU core can run only one system each time. For example, the OS and the BIOS may pre-agree on a shared register or memory. For example, a BIOS invocation program and a scheduler may pre-agree on a shared register or memory. For example, the BIOS invocation program includes an interrupt instruction. For example, after the BIOS invocation program receives the invocation of the setup menu program, the BIOS invocation program can write obtained configuration modification information into the shared register or memory. After the interrupt instruction in the BIOS invocation program is executed by the CPU, the CPU stops running the BIOS invocation program, and starts to run the scheduler. After the scheduler is run, a configuration interface of the scheduler can be invoked to read, from the shared register or memory, the configuration modification information written by the BIOS invocation program, and then the scheduler performs S404 based on the configuration modification information.

For example, the OS and the BIOS may be two systems that can run simultaneously; and the OS may be a main system, and the BIOS may be a subsystem; or both the OS and the BIOS are subsystems. For example, the BIOS invocation program can invoke the scheduler via the mailbox. For example, the OS and the BIOS may pre-agree on a shared register or memory. For example, the BIOS invocation program and the scheduler pre-agree on a shared register or memory. For example, the BIOS invocation program includes an interrupt instruction. For example, after the BIOS invocation program receives the invocation of the setup menu program, the BIOS invocation program can write the obtained configuration modification information into the shared register or memory. For example, the scheduler can also be used to respond to the interrupt. After the interrupt instruction in the BIOS invocation program is executed, the interrupt can be triggered. Then, the scheduler responds to the interrupt, and invokes the configuration interface of the scheduler to read, from the shared register or memory, the configuration modification information written by the BIOS invocation program, and then the scheduler performs S404 based on the configuration modification information. For example, the BIOS further includes a BIOS interrupt response program, and the BIOS interrupt response program is used to respond to an interrupt. After the interrupt instruction in the BIOS invocation program is executed, the interrupt can be triggered. Then, the BIOS interrupt response program responds to the interrupt and invokes the configuration interface of the scheduler. After receiving the invocation, the configuration interface of the scheduler reads, from the shared register or memory, the configuration modification information written by the BIOS invocation program, and then the scheduler performs S404 based on the configuration modification information.

S404: The scheduler invokes a function configuration program.

For example, the scheduler can invoke a corresponding function configuration program based on the configuration modification information.

For example, the function configuration program can provide a function configuration interface, and the scheduler can invoke a function configuration interface of a corresponding function configuration program, to invoke the corresponding function configuration program.

After reading the configuration modification information written by the BIOS invocation program, the configuration interface of the scheduler may parse the configuration modification information to determine the function identifier and the user setting information, and then perform parsing based on the function identifier to determine the to-be-scheduled target function configuration program. For example, an association relationship between a function identifier and a function configuration program may be preconfigured and stored, and the scheduler may parse the function identifier based on the association relationship between a function identifier and a function configuration program, and determine the to-be-scheduled target function configuration program.

For example, the association relationship between a function identifier and a function configuration program is shown in Table 3:

TABLE 3

| Function identifier | Function configuration program |
|---|---|
| COM1 BPS | Function configuration program 1 |
| PCIel Switch | Function configuration program 2 |
| CPU EE | Function configuration program 3 |
| BIOS FTR | Function configuration program 4 |
| . . . | . . . |

For example, if the function identifier in the configuration modification information is COM1_BPS, the scheduler can determine, based on the association relationship in Table 3, that the function configuration program 1 is the target function configuration program.

For example, if the function identifier in the configuration modification information is PCIe1_Switch, the scheduler can determine, based on the association relationship in Table 3, that the function configuration program 2 is the target function configuration program.

For example, if the function identifier in the configuration modification information is CPU_EE, the scheduler can determine, based on the association relationship in Table 3, that the function configuration program 3 is the target function configuration program.

For example, if the function identifier in the configuration modification information is BIOS_FTR, the scheduler can determine, based on the association relationship in Table 3, that the function configuration program 4 is the target function configuration program.

For example, the scheduler can invoke the function configuration interface of the target function configuration program, and transfer the function identifier and the user setting information into the function configuration interface of the target function configuration program, to invoke the target function configuration program.

Refer to FIG. 4. For example, the target function configuration program determined by the scheduler is the function configuration program 1, and the scheduler can invoke a function configuration interface of the function configuration program 1, and transfer the configuration modification information into the function configuration interface of the function configuration program 1, to invoke the function configuration program 1.

S405: The function configuration program configures hardware.

For example, after the function configuration program is invoked, a function can be configured. The function configuration program can configure hardware based on the function identifier and the user setting information. The function configuration program can send an indication to a hardware device or a software program based on the function identifier and the user setting information, to implement hardware configuration.

Refer to Table 3. For example, if the function identifier in the configuration modification information is COM1_BPS, and the user setting information is 115200 bps, the function configuration program 1 can send an indication to a serial port chip of the COM 1, so as to indicate the serial port chip of the COM 1 to configure the baud rate of the COM 1 as "115200 bps".

Refer to Table 3. For example, if the function identifier in the configuration modification information is PCIe1_Switch, and the user setting information is OFF, the function configuration program 2 can send an indication to a PCIe chip of PCIe 1, so as to indicate the PCIe chip of PCIe 1 to disable PCIe 1.

Refer to Table 3. For example, if the function identifier in the configuration modification information is CPU_EE, and the user setting information is an energy efficiency level 2, the function configuration program 4 can send an indication to an energy efficiency management program of the CPU, so as to indicate the energy efficiency management program of the CPU to configure the energy efficiency of the CPU as the energy efficiency level 2.

It should be noted that FIG. 4 shows only hardware configured by the function configuration program. Certainly, the function configuration program can further configure a BIOS function. For example, if the function identifier is BIOS_FTR, and the user setting information is a policy 3, the function configuration program 4 can send an indication to a fault tolerance management program of the BIOS, so as to indicate the fault tolerance management program to configure the fault tolerance policy of the BIOS as the policy 3.

S406: The function configuration program writes the configuration modification information into a data storage area of the BIOS.

For example, after the function configuration program is invoked, the configuration modification information input by the scheduler may also be used to update a configuration result that is of a function corresponding to the function identifier and that is stored in the data storage area of the BIOS (which may be configuration modification information corresponding to the system configuration modified by the user last time, or may be a default configuration result of the computer system).

For example, the function configuration program may search, based on the function identifier in the configuration modification information, for the configuration result that is of the function corresponding to the function identifier and that is stored in the data storage area of the BIOS. Optionally, the function configuration program may overwrite, in an overwriting manner, and by using user setting information in the configuration modification information, the configuration result that is of the function corresponding to the function identifier and that is stored in the data storage area of the BIOS. Optionally, the function configuration program may delete the configuration result that is of the function corresponding to the function identifier and that is stored in the data storage area of the BIOS, and then write the user setting information that is of the function corresponding to the function identifier and that is in the configuration modification information.

Refer to Table 3. For example, if the function identifier in the configuration modification information is COM1_BPS, and the user setting information is 115200 bps, the function configuration program 1 can update the configuration result of the baud rate of the COM 1 from "9600 bps" to "115200 bps" in the data storage area of the BIOS.

Refer to Table 3. For example, if the function identifier in the configuration modification information is PCIe1_Switch, and the user setting information is OFF, the function configuration program 2 can update the on/off state of the PCIe 1 from "ON" to "OFF" in the data storage area of the BIOS.

Refer to Table 3. For example, if the function identifier in the configuration modification information is CPU_EE, and the user setting information is an energy efficiency level 2, the function configuration program 3 can update the energy efficiency of the CPU from the "energy efficiency level 1" to the "energy efficiency level 2" in the data storage area of the BIOS.

Refer to Table 3. For example, if the function identifier in the configuration modification information is BIOS_FTR, and the user setting information is a fault tolerance policy 3, the function configuration program 4 can update the fault tolerance policy of the BIOS from a "policy 1" to the "policy 3" in the data storage area of the BIOS.

For example, a sequence of performing S405 and S406 is not limited in this embodiment of this application. In other words, S405 and S406 may be simultaneously performed, or S405 may be performed before S406, or S406 may be performed before S405.

For example, the function configuration program for performing S405 and the function configuration program for performing S406 may be a same function configuration program. Refer to FIG. 4. For example, the scheduler may invoke the function configuration program 1 to perform S405 and S406.

Refer to Table 3. For example, the user modifies a baud rate of the COM 1 from "9600 bps" to "115200 bps" on the home screen of the setup menu program; the function configuration program 1 can configure the baud rate of the COM 1 as "115200 bps"; and the function configuration program 1 can modify the configuration result of the baud rate of the COM 1 from "9600 bps" to "115200 bps" in the data storage area of the BIOS.

For example, the function configuration program for performing S405 and the function configuration program for performing S406 may be different function configuration programs. For example, the scheduler may invoke the function configuration program 1 to perform S405, and invoke a function configuration program 5 to perform S406.

Refer to Table 3. For example, the user modifies an on/off state of the PCIe 1 from "ON" to "OFF" on the home screen of the setup menu program. A function configuration program 2 configures the on/off state of the PCIe 1 as "OFF", and a function configuration program 12 updates the on/off state of the PCIe 1 from "ON" to "OFF" in the data storage area of the BIOS.

Refer to Table 3. For example, the user modifies the energy efficiency of the CPU from an "energy efficiency level 1" to an "energy efficiency level 2" on the home screen of the setup menu program. A function configuration program 3 configures energy efficiency of a CPU as an "energy efficiency level 2", and a function configuration program 13 updates the energy efficiency of the CPU from an "energy efficiency level 1" to an "energy efficiency level 2" in the data storage area of the BIOS.

Refer to Table 3. For example, the user modifies a fault tolerance policy of the BIOS from a "policy 1" to a "policy 3" on the home screen of the setup menu program. A function configuration program 4 configures the fault tolerance policy of the BIOS as a "fault tolerance policy 3", and a function configuration program 14 updates the fault tolerance policy of the BIOS from the "policy 1" to the "policy 3" in the data storage area of the BIOS.

It may be understood that whether the function configuration programs for performing S405 and S406 are a same function configuration program is not limited in this embodiment of this application.

For example, because the configuration modification information is stored in the data storage area of the BIOS, in a next startup process of the computer system, after the BIOS runs, in a process in which the BIOS performs hardware initialization, the BIOS can read the configuration modification information from the data storage area of the BIOS, initialize corresponding hardware based on the configuration modification information, generate new BIOS function information, and transfer the new BIOS function information to the OS after the OS runs. After the user starts the setup menu program, the setup menu program can display the modification result of the previous configuration modification operation.

For example, the user modifies the baud rate of the COM 1 from "9600 bps" to "115200 bps" on the home screen of the setup menu program last time. After the user restarts a computer or shuts down the computer for the next restart, namely, in the startup process of the computer system, the BIOS reads the baud rate of the COM 1 as 115200 bps, and then the BIOS may initialize the baud rate of the COM 1 to "115200 bps". After the computer system is started, the user starts the setup menu program. The baud rate of the COM 1 displayed on the home screen of the setup menu program is "115200 bps".

For example, the user modifies the on/off state of the PCIe 1 from "ON" to "OFF" on the home screen of the setup menu program last time. After the user restarts the computer or shuts down the computer for the next restart, namely, in the startup process of the computer system, the BIOS reads the on/off state of the PCIe 1 from the data storage area of the BIOS as OFF, and then the BIOS may disable PCIe 1. After the computer system is started, the user starts the setup menu program. The on/off state of the PCIe 1 displayed on the home screen of the setup menu program is "OFF".

For example, the user modifies the energy efficiency of the CPU from the "energy efficiency level 1" to the "energy efficiency level 2" on the home screen of the setup menu program last time. After the user restarts the computer or shuts down the computer for the next restart, namely, in the startup process of the computer system, after the BIOS runs, and in a process of performing hardware initialization by the BIOS, the BIOS can read the energy efficiency of the CPU from the data storage area of the BIOS as the "energy efficiency level 2", and then the BIOS can initialize the energy efficiency of the CPU as the "energy efficiency level 2". After the computer system is started, the user starts the setup menu program. The energy efficiency level of the CPU displayed on the home screen of the setup menu program is the "energy efficiency level 2".

For example, the user modifies the fault tolerance policy of the BIOS from the "policy 1" to the "policy 3" on the home screen of the setup menu program last time. After the user restarts the computer or shuts down the computer for the next restart, namely, in the startup process of the computer system, after the BIOS runs, and before the BIOS performs hardware initialization, the BIOS can read the fault tolerance policy of the BIOS as "policy 3" from the data storage area of the BIOS, and then the BIOS can configure the fault tolerance policy of the BIOS as the "policy 3". After the computer system is started, the user starts the setup menu program. The fault tolerance policy of the BIOS displayed on the home screen of the setup menu program is the "policy 3".

It can be learned from the foregoing description that, in the startup process of the setup menu program, the information stored in the data storage area of the BIOS is obtained by using the BIOS function information table or the information obtaining interface provided by the BIOS for the OS; and the scheduler in the BIOS may provide the interface for the OS to invoke the BIOS, so that after the user performs the configuration modification operation in the setup menu program, the OS writes the configuration modification information into the data storage area of the BIOS by using the interface provided by the BIOS. Therefore, the OS cannot directly access the data storage area of the BIOS. This can improve security of the BIOS data.

In addition, a setup menu is decoupled from the BIOS. After the setup menu is modified or upgraded, the BIOS does not need to be upgraded. This reduces a risk of upgrading the BIOS and improves convenience of modifying and upgrading the setup menu. Compared with the conventional technology in which a setup menu is implemented in a BIOS, this embodiment of this application designs the setup menu based on the OS, has a more friendly interaction interface, and improves user experience.

For example, a data storage area of the OS is further set in the memory, and the data storage area of the OS is used to store configuration information.

For example, configuration information that is of a function invoked by the OS and that is in the data storage area of the BIOS may be shared in advance with the data storage area of the OS.

For example, in a process of modifying the system configuration in the setup menu program, the user may store the configuration modification information in the data storage area of the OS, but not in the data storage area of the BIOS.

Figure 5:
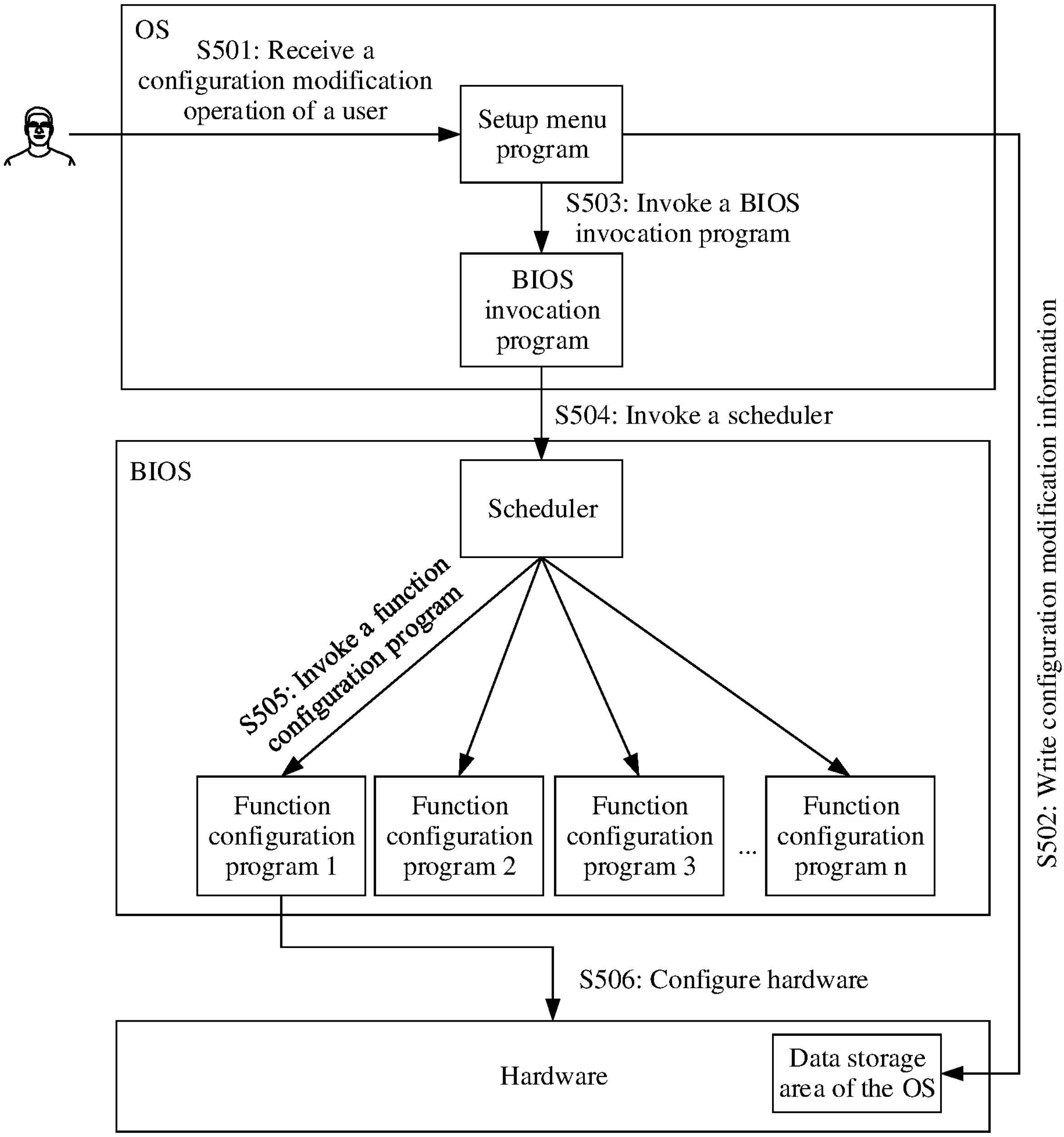
FIG. 5 is a schematic diagram of an example of a configuration process.

FIG. 5 is a schematic diagram of an example of a configuration process. Refer to FIG. 5. In response to operation behavior of a user in a setup menu program, a process of configuring a function by a computer system may be as follows:

S501: The setup menu program receives a configuration modification operation of the user.

S502: The setup menu program writes configuration modification information into a data storage area of an OS.

S503: The setup menu program invokes a BIOS invocation program.

S504: The BIOS invocation program invokes a scheduler.

S505: The scheduler invokes a function configuration program.

S506: The function configuration program configures hardware.

For example, for S501 and S503 to S506, refer to the foregoing descriptions of S401 to S405.

For example, the configuration modification information may be stored in the data storage area of the OS by using the setup menu program.

For example, the user performs the configuration modification operation in the setup menu program, and the setup menu program receives the configuration modification operation of the user, and determines configuration modification information corresponding to the configuration modification operation of the user. Then, based on the determined configuration modification information, a configuration result that is of a function corresponding to the function identifier and that is stored in the data storage area of the OS is updated (which may be configuration modification information when the user modifies the system last time, or may be a default configuration result of the computer system).

For example, the setup menu program may search, based on the function identifier in the configuration modification information, for the configuration result that is of the function corresponding to the function identifier and that is stored in the data storage area of the OS. Optionally, the setup menu program may overwrite, in an overwriting manner, and by using user setting information in the configuration modification information, the configuration result that is of the function corresponding to the function identifier and that is stored in the data storage area of the OS. Optionally, the setup menu program may delete the configuration result that is of the function corresponding to the function identifier and that is stored in the data storage area of the OS, and then write the user setting information that is of the function corresponding to the function identifier and that is in the configuration modification information.

For example, a sequence of performing S502 and S503 is not limited in this embodiment of this application. In other words, S502 and S503 may be simultaneously performed, or S502 may be performed before S503, or S503 may be performed before S502.

Refer to Table 3. For example, if a function identifier in the configuration modification information is COM1_BPS, and user setting information is 115200 bps, the setup menu program can update a configuration result of a baud rate of the COM 1 from "9600 bps" to "115200 bps" in the data storage area of the OS; and a function configuration program 1 can configure the baud rate of the COM 1 as "115200 bps".

Refer to Table 3. For example, if a function identifier in the configuration modification information is PCIe1_Switch, and user setting information is OFF, the setup menu program can update an on/off state of the PCIe 1 from "ON" to "OFF" in the data storage area of the OS; and a function configuration program 2 can disable PCIe 1.

Refer to Table 3. For example, if a function identifier in the configuration modification information is CPU_EE, and user setting information is an energy efficiency level 2, the setup menu program can update energy efficiency of the CPU from an "energy efficiency level 1" to the "energy efficiency level 2" in the data storage area of the OS; and a function configuration program 3 can configure the energy efficiency of the CPU as the energy efficiency level 2.

Refer to Table 3. For example, if a function identifier in the configuration modification information is BIOS_FTR, and user setting information is a fault tolerance policy 3, the setup menu program can update a fault tolerance policy of BIOS from a "policy 1" to the "policy 3" in the data storage area of the OS; and a function configuration program 4 can configure the fault tolerance policy of BIOS as the policy 3.

Figure 6:
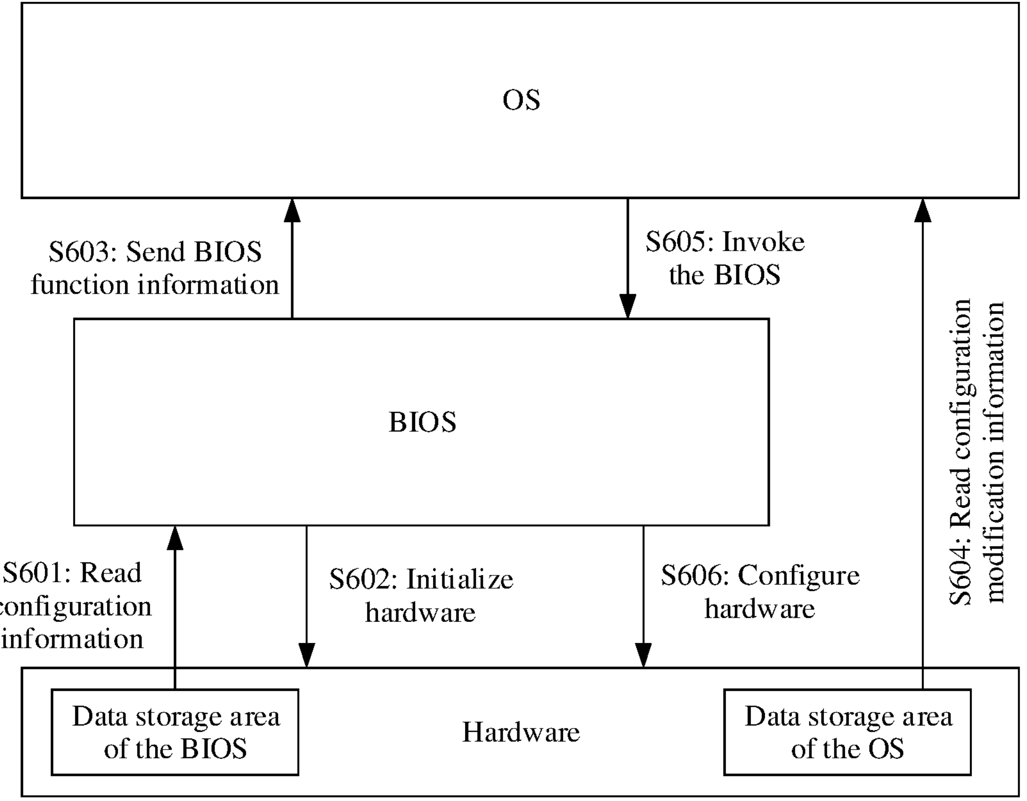
FIG. 6 is a schematic diagram of an example of a startup process of a computer system.

FIG. 6 is a schematic diagram of an example of a startup process of a computer system. Refer to FIG. 6. After configuration modification information is stored in a data storage area of an OS, and a user restarts a computer or shuts down the computer for the next restart, the computer system starts data interaction, which may be as follows:

S601: A BIOS reads configuration information from a data storage area of the BIOS.

S602: The BIOS initializes hardware based on the configuration information.

S603: The BIOS transfers BIOS function information to the OS.

For example, for S601 to S603, refer to S101 to S103 above.

S604: The OS reads the configuration modification information from the data storage area of the OS.

S605: The OS invokes the BIOS.

S606: The BIOS configures the hardware based on the configuration modification information.

When the user modifies system configuration last time, configuration modification information of a corresponding function is not stored in the data storage area of the BIOS. As a result, a configuration result in the configuration information read by the BIOS from the data storage area of the BIOS is a configuration result that is not modified. Therefore, after the BIOS initializes the hardware based on the configuration information, the hardware is still configured as a default configuration result of the BIOS, and is not configuration modification information corresponding to a configuration modification operation performed by the user. Further, after the OS runs, the OS can read the configuration modification information from the data storage area of the OS, and then the OS invokes the BIOS to configure the hardware based on the configuration modification information.

For example, the OS can invoke a BIOS invocation program, the BIOS invocation program invokes a scheduler, and then the scheduler invokes a corresponding function configuration program, to perform function configuration based on the configuration modification information. For details, refer to the foregoing descriptions of S403 to S405.

For example, the user modifies a baud rate of the COM 1 from "9600 bps" to "115200 bps" on a home screen of a setup menu program last time. After the user restarts the computer or shuts down the computer for the next restart, namely, in the startup process of the computer system, the BIOS reads the baud rate of the COM 1 as 9600 bps from the data storage area of the BIOS, and then initializes the baud rate of the COM 1 to "9600 bps". After the OS runs, OS reads a configuration result of the baud rate of the COM 1 as "115200 bps" from the data storage area of the OS. Then, the OS invokes the BIOS invocation program, the BIOS invocation program invokes the scheduler, and the scheduler invokes the function configuration program to configure the baud rate of the COM 1 as 115200 bit/s. After the computer system is started, the user starts the setup menu program. The baud rate of the COM 1 displayed on the home screen of the setup menu program is "115200 bps".

For example, the user modifies an on/off state of the PCIe 1 from "ON" to "OFF" on the home screen of the setup menu program last time. After the user restarts the computer or shuts down the computer for the next restart, namely, in the startup process of the computer system, the BIOS reads the on/off state of the PCIe 1 as ON from the data storage area of the BIOS, and then the BIOS may open the PCIe 1. After the OS runs, the OS reads a configuration result from the data storage area of the OS, and then the OS invokes the BIOS invocation program, the BIOS invocation program invokes the scheduler, and the scheduler invokes a function configuration program to disable PCIe 1. After the computer system is started, the user can start the setup menu program. The on/off state of the PCIe 1 displayed on the home screen of the setup menu program is "OFF".

For example, the user modifies energy efficiency of a CPU from an "energy efficiency level 1" to an "energy efficiency level 2" on the home screen of the setup menu program last time. After the user restarts the computer or shuts down the computer for the next restart, namely, in the startup process of the computer system, after the BIOS runs, and in a process of performing hardware initialization by the BIOS, the BIOS can read the energy efficiency of the CPU as the "energy efficiency level 1" from the data storage area of the BIOS. Then, the BIOS can initialize the energy efficiency of the CPU to the "energy efficiency level 1". After the OS runs, the OS reads a configuration result from the data storage area of the OS, and then the OS invokes the BIOS invocation program, the BIOS invocation program invokes the scheduler, and the scheduler invokes a function configuration program to configure the energy efficiency of the CPU as the "energy efficiency level 2". After the computer system is started, the user starts the setup menu program. The energy efficiency level of the CPU displayed on the home screen of the setup menu program is the "energy efficiency level 2".

For example, the user modifies a fault tolerance policy of the BIOS from a "policy 1" to a "policy 3" on the home screen of the setup menu program last time. After the user restarts the computer or shuts down the computer for the next restart, namely, in the startup process of the computer system, after the BIOS runs, and before the BIOS performs hardware initialization, the BIOS can read the fault tolerance policy of the BIOS as the "policy 1" from the data storage area of the BIOS. Then, the BIOS can configure the fault tolerance policy of the BIOS as the "policy 1". After the OS runs, the OS reads a configuration result from the data storage area of the OS, and then the OS invokes the BIOS invocation program, the BIOS invocation program invokes the scheduler, and the scheduler invokes a function configuration program to configure the fault tolerance policy of the BIOS as the "policy 3". After the computer system is started, the user starts the setup menu program. The fault tolerance policy of the BIOS displayed on the home screen of the setup menu program is the "policy 3".

For example, in a process of modifying the system configuration in the setup menu program, the user can store the configuration modification information in the data storage area of the OS and the data storage area of the BIOS.

Figure 7:
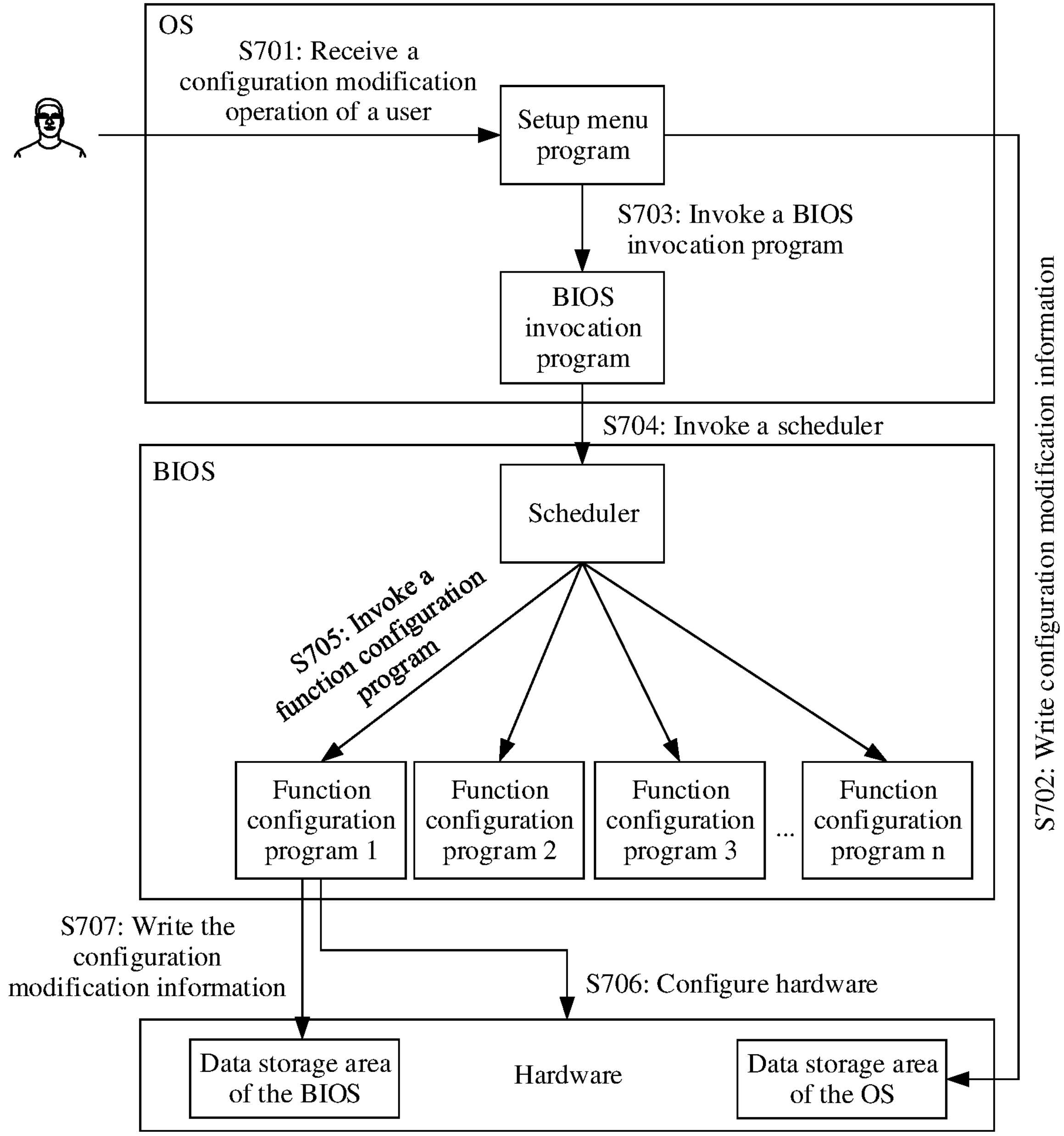
FIG. 7 is a schematic diagram of an example of a configuration process.

FIG. 7 is a schematic diagram of an example of a configuration process. Refer to FIG. 7. In response to operation behavior of a user in a setup menu program, a process of configuring a function by a computer system may be as follows:

S701: The setup menu program receives a configuration modification operation of the user.

S702: The setup menu program writes configuration modification information into a data storage area of a BIOS.

S703: The setup menu program invokes a BIOS invocation program.

S704: The BIOS invocation program invokes a scheduler.

S705: The scheduler invokes a function configuration program.

S706: The function configuration program configures hardware.

S707: The function configuration program writes the configuration modification information into the data storage area of the BIOS.

For example, for S701 and S703 to S706, refer to the foregoing descriptions of S401 to S405.

For example, for S702, refer to the foregoing description of S502.

For example, for S707, refer to the foregoing description of S406.

For example, a sequence of performing S702 and S703 is not limited in this embodiment of this application. In other words, S702 and S703 may be simultaneously performed, or S702 may be performed before S703, or S703 may be performed before S702.

For example, a sequence of performing S706 and S707 is not limited in this embodiment of this application. In other words, S706 and S707 may be simultaneously performed, or S706 may be performed before S707, or S707 may be performed before S706.

For example, the function configuration program for performing S706 and the function configuration program for performing S707 may be a same function configuration program. Refer to FIG. 7. For example, the scheduler may invoke a function configuration program 1 to perform S706 and S707.

For example, the function configuration program for performing S706 and the function configuration program for performing S707 may be different function configuration programs. For example, the scheduler may invoke the function configuration program 1 to perform S706, and invoke a function configuration program 7 to perform S707.

It may be understood that whether the function configuration programs for performing S706 and S707 are a same function configuration program is not limited in this embodiment of this application.

Refer to Table 3. For example, if a function identifier in the configuration modification information is COM1_BPS, and user setting information is 115200 bps, the setup menu program can update a configuration result of a baud rate of the COM 1 from "9600 bps" to "115200 bps" in a data storage area of an OS; the function configuration program 1 can configure the baud rate of the COM 1 as "115200 bps"; and the function configuration program 1 can update a configuration result of a baud rate of the COM 1 from "9600 bps" to "115200 bps" in the data storage area of the BIOS.

Refer to Table 3. For example, if a function identifier in the configuration modification information is PCIe1_Switch, and user setting information is OFF, the setup menu program can update an on/off state of the PCIe 1 from "ON" to "OFF" in the data storage area of the OS; a function configuration program 2 can disable PCIe 1; and the function configuration program 2 can update an on/off state of the PCIe 1 from "ON" to "OFF" in the data storage area of the BIOS.

Refer to Table 3. For example, if a function identifier in the configuration modification information is CPU_EE, and user setting information is an energy efficiency level 2, the setup menu program can update energy efficiency of the CPU from an "energy efficiency level 1" to the "energy efficiency level 2" in the data storage area of the OS; a function configuration program 3 can configure the energy efficiency of the CPU as the energy efficiency level 2; and the function configuration program 3 can update an energy efficiency of the CPU from the "energy efficiency level 1" to the "energy efficiency level 2" in the data storage area of the BIOS.

Refer to Table 3. For example, if a function identifier in the configuration modification information is BIOS_FTR, and user setting information is a fault tolerance policy 3, the setup menu program can update a fault tolerance policy of BIOS from a "policy 1" to the "policy 3" in the data storage area of the OS; a function configuration program 4 can configure the fault tolerance policy of BIOS as the policy 3; and the function configuration program 3 can update the fault tolerance policy of BIOS from the "policy 1" to the "policy 3" in the data storage area of the BIOS.

For example, because the configuration modification information is stored in the data storage area of the BIOS, in a next startup process of the computer system, the BIOS can read the configuration modification information from the data storage area of the BIOS and initialize the hardware based on the configuration modification information. This is similar to the foregoing description.

It should be noted that, based on a requirement, the configuration modification information of a first part of functions may be stored in the data storage area of the OS, and the configuration modification information of a second part of functions may be stored in the data storage area of the BIOS. There may be an intersection set between the first part of functions and the second part of functions, or there may be no intersection set between the first part of functions and the second part of functions. This is not limited in this embodiment of this application.

Figure 8:
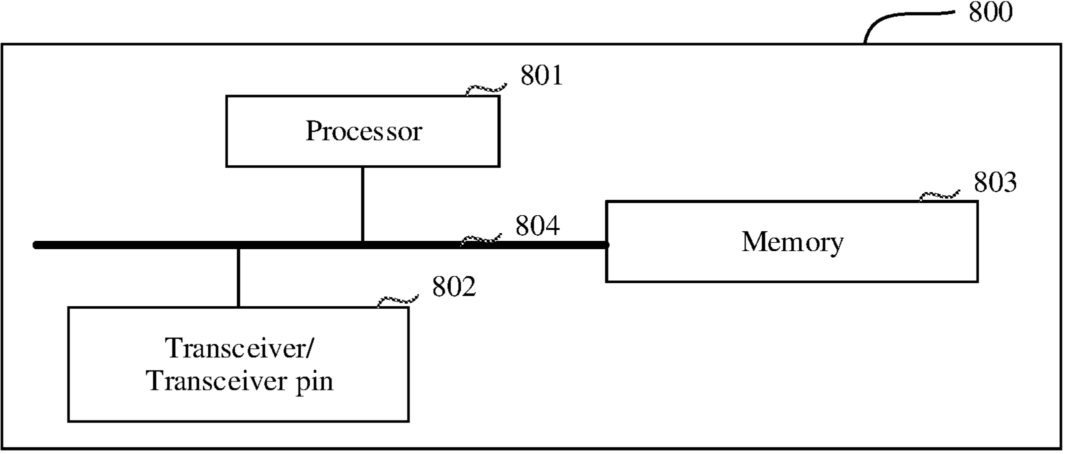
FIG. 8 is a schematic diagram of a structure of an example of an apparatus.

In an example, FIG. 8 is a schematic block diagram of an apparatus 800 according to an embodiment of this application. The apparatus 800 may include a processor 801 and a transceiver/transceiver pin 802, and optionally, further include a memory 803.

Components of the apparatus 800 are coupled together through a bus 804. In addition to a data bus, the bus 804 further includes a power bus, a control bus, and a status signal bus. However, for clear description, various buses in the figure are referred to as the bus 804.

Optionally, the memory 803 may be configured to store instructions in the foregoing method embodiments. The processor 801 may be configured to: execute the instructions in the memory 803, control a receive pin to receive a signal, and control a transmit pin to send a signal.

The apparatus 800 may be the electronic device or a chip of the electronic device in the foregoing method embodiments.

All related content of the steps in the foregoing method embodiments may be cited in function descriptions of the corresponding functional modules.

An embodiment further provides a computer storage medium. The computer storage medium stores computer instructions. When the computer instructions are run on an electronic device, the electronic device is enabled to perform the steps of the related method, to implement the data processing method in the foregoing embodiments.

An embodiment further provides a computer program product. When the computer program product runs on a computer, the computer is enabled to perform the foregoing related steps, to implement the data processing method in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the data processing method in the foregoing method embodiments.

The electronic device, the computer storage medium, the computer program product, or the chip provided in embodiments is configured to perform the corresponding method provided above. Therefore, for beneficial effect that can be achieved, refer to the beneficial effect of the corresponding method provided above.

Based on descriptions about the foregoing implementations, a person skilled in the art may understand that, for a purpose of convenient and brief description, division into the foregoing function modules is used as an example for illustration. In actual application, the foregoing functions may be allocated to different function modules and implemented based on a requirement. In other words, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, each functional unit in embodiments of this application may be integrated into one processing unit, or each of the units may exist alone physically, or two or more units are integrated into one unit. The integrated unit may be implemented in a form of hardware, or may be implemented in a form of a software functional unit.

Any content of the embodiments of this application and any content of a same embodiment may be freely combined. Any combination of the foregoing content shall fall within the scope of this application.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing describes embodiments of this application with reference to the accompanying drawings. However, this application is not limited to the foregoing specific implementations. The foregoing specific implementations are merely examples, but are not limited. Inspired by this application, a person of ordinary skill in the art may further make many modifications without departing from the purposes of this application and the protection scope of the claims, and all the modifications shall fall within the protection scope of this application.

Methods or algorithm steps described in combination with the content disclosed in this embodiment of this application may be implemented by hardware, or may be implemented by a processor by executing a software instruction. The software instruction may include a corresponding software module. The software module may be stored in a random access memory (RAM), a flash memory, a read only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an application-specific integrated circuit (ASIC).

A person skilled in the art should be aware that in the foregoing one or more examples, functions described in embodiments of this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

The foregoing describes embodiments of this application with reference to the accompanying drawings. However, this application is not limited to the foregoing specific implementations. The foregoing specific implementations are merely examples, but are not limited. Inspired by this application, a person of ordinary skill in the art may further make many modifications without departing from the purposes of this application and the protection scope of the claims, and all the modifications shall fall within the protection scope of this application.

What is claimed is:

1. A computer system including an operating system and firmware, the operating system including a setup menu program, the firmware including a configuration program, and the system comprising:

processing circuitry including at least one processor, wherein the processing circuitry is configured to:

invoke, via the setup menu program and using a firmware invocation program, the configuration program in response to a received configuration modification operation of a user; and configure, via the configuration program, and in response to invoking the setup menu program, a corresponding function based on configuration modification information corresponding to the configuration modification operation, wherein a function of the configuration program is implemented by a scheduler and a plurality of function configuration programs, the setup menu program is configured to invoke the scheduler in response to the received configuration modification operation of the user, and the scheduler is configured to: in response to invoking the setup menu program, parse the configuration modification information, determine a target function configuration program, and invoke the target function configuration program.

2. The system according to claim 1, wherein the processing circuitry further comprises a memory, a data storage area of the operating system is disposed in the memory, and the setup menu program is configured to store the configuration modification information in the data storage area of the operating system.

3. The system according to claim 1, wherein the processing circuitry further comprises a memory, a data storage area of the firmware is disposed in the memory, and the configuration program is configured to store the configuration modification information in the data storage area of the firmware in response to invoking the setup menu program.

4. The system according to claim 1, wherein the function configuration program configures, in response to invoking the scheduler, the corresponding function based on the configuration modification information.

5. The system according to claim 1, wherein the setup menu program is configured to invoke the configuration program via a dedicated instruction, a mailbox, or an interrupt.

6. The system according to claim 1, wherein the setup menu program and the firmware invocation program are independent of each other.

7. The system according to claim 1, wherein the firmware invocation program belongs to the operating system (OS), and the scheduler belongs to the firmware.

8. A computer system including an operating system and firmware, the operating system including a setup menu program and a program for invoking firmware, the firmware including a configuration program, and the system comprising:

processing circuitry including at least one processor, wherein the processing circuitry is configured to:

invoke, via the setup menu program, the program for invoking the firmware in response to a received configuration modification operation of a user;

invoke, via the program for invoking the firmware, the configuration program in response to invoking the setup menu program; and configure, via the configuration program, and in response to invoking the program for invoking the firmware, a corresponding function based on configuration modification information corresponding to the configuration modification operation, wherein a function of the configuration program is implemented by a scheduler and a plurality of function configuration programs, the program for invoking the firmware is configured to invoke the scheduler in response to invoking the setup menu program, and the scheduler is configured to: in response to invoking the program for invoking the firmware, parse the configuration modification information, determine a target function configuration program, and invoke the target function configuration program.

9. The system according to claim 8, wherein the processing circuitry further comprises a memory, a data storage area of the operating system is disposed in the memory, and the setup menu program is configured to store the configuration modification information in the data storage area of the operating system.

10. The system according to claim 8, wherein the processing circuitry further comprises a memory, a data storage area of the firmware is disposed in the memory, and the configuration program is configured to store the configuration modification information in the data storage area of the firmware in response to invoking the program for invoking the firmware.

11. The system according to claim 8, wherein the function configuration program configures, in response to invoking the scheduler, the corresponding function based on the configuration modification information.

12. The system according to claim 8, wherein the program for invoking the firmware is configured to invoke the configuration program via a dedicated instruction, a mailbox, or an interrupt.

13. The system according to claim 8, wherein the setup menu program and the firmware invocation program are independent of each other.

14. The system according to claim 8, wherein the firmware invocation program belongs to the operating system (OS), and the scheduler belongs to the firmware.

15. A data processing method applied to a computer system, the computer system including an operating system and firmware, the operating system including a setup menu program, the firmware including a configuration program, and the method comprising:

invoking, by the setup menu program and using a firmware invocation program, the configuration program in response to a received configuration modification operation of a user; and configuring, by the configuration program, and in response to invoking the setup menu program, a corresponding function based on configuration modification information corresponding to the configuration modification operation, wherein a function of the configuration program is implemented by a scheduler and a plurality of function configuration programs, invoking, by the setup menu program, the configuration program in response to the received configuration modification operation comprises;

invoking, by the setup menu program, the scheduler in response to the received configuration modification operation, and configuring, by the configuration program, the corresponding function based on the configuration modification information comprises:

in response to invoking the setup menu program, parsing, by the scheduler, the configuration modification information, determining a target function configuration program, and invoking the target function configuration program.

16. The method according to claim 15, wherein the computer system further comprises hardware including a memory, a data storage area of the operating system is disposed in the memory, and the method further comprises:

storing, by the setup menu program, the configuration modification information in the data storage area of the operating system.

17. The method according to claim 15, wherein the computer system further comprises hardware including a memory, a data storage area of the firmware is set in the memory, and the method further comprises:

storing, by the configuration program, the configuration modification information in the data storage area of the firmware in response to invoking the setup menu program.

18. The method according to claim 15, wherein the function configuration program configures, in response to invoking the scheduler, the corresponding function based on the configuration modification information.

19. The method according to claim 15, wherein invoking, by the setup menu program, the configuration program in response to the received configuration modification operation comprises:

invoking, by the setup menu program, and in response to the received configuration modification operation of the user, the configuration program via a dedicated instruction, a mailbox, or an interrupt.

20. The method according to claim 15, wherein the firmware invocation program belongs to the operating system (OS), and the scheduler belongs to the firmware.

* * * * *